United States Patent
Bodin et al.

(10) Patent No.: US 7,843,592 B2
(45) Date of Patent: Nov. 30, 2010

(54) EDITING AND BROWSING IMAGES FOR VIRTUAL CAMERAS

(75) Inventors: William Kress Bodin, Austin, TX (US); Derral Charles Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 12/107,090

(22) Filed: Apr. 22, 2008

(65) Prior Publication Data

US 2008/0198409 A1 Aug. 21, 2008

Related U.S. Application Data

(63) Continuation of application No. 10/322,058, filed on Dec. 17, 2002, now abandoned.

(51) Int. Cl.
- G06F 3/14 (2006.01)
- G06K 15/00 (2006.01)
- G06K 9/54 (2006.01)
- G06K 9/60 (2006.01)

(52) U.S. Cl. ........................ 358/1.15; 358/1.18; 382/305
(58) Field of Classification Search .................. None
See application file for complete search history.

(56) References Cited

U.S. PATENT DOCUMENTS

| | | | |
|---|---|---|---|
| 5,729,471 A | 3/1998 | Jain et al. | |
| 6,144,375 A | 11/2000 | Jain et al. | |
| 6,408,301 B1 | 6/2002 | Patton et al. | |
| 2002/0033967 A1 | 3/2002 | Liu | |
| 2002/0063901 A1 | 5/2002 | Hicks | |
| 2002/0113872 A1* | 8/2002 | Kinjo | 348/116 |

FOREIGN PATENT DOCUMENTS

EP 0797173 9/1997

(Continued)

OTHER PUBLICATIONS

Drucker, et al.; Proceeding of Graphics Interface '94; pp. 190-199; Presented at a conference in Banff, Canada on May 18-20, 1994.

(Continued)

*Primary Examiner*—David K Moore
*Assistant Examiner*—Vincent Rudolph
(74) *Attorney, Agent, or Firm*—Artoush Ohanian; Libby Z. Toub; Biggers & Ohanian, LLP

(57) ABSTRACT

Digital imaging including creating, in a virtual camera, an unedited image request for an unedited digital image; editing the unedited image request, producing an edited image request for an edited image; communicating the edited image request to a web site for imaging for virtual cameras; receiving, in the virtual camera, the edited digital image from the web site; and displaying the edited digital image on a display device of a user interface of the virtual camera. Digital imaging including identifying a browsing image request data element from among image request data elements of an image request data structure; and creating, in dependence upon the identified browsing image request data element, a multiplicity of image requests for digital images, wherein values of the browsing image request data elements vary among the image requests.

24 Claims, 15 Drawing Sheets

FOREIGN PATENT DOCUMENTS

| | | |
|---|---|---|
| JP | 08-161398 | 6/1996 |
| JP | 2000-197031 | 7/2000 |
| JP | 2000-232660 | 8/2000 |
| JP | 2000-288248 | 10/2000 |
| WO | WO 99/65223 | 12/1999 |

OTHER PUBLICATIONS

Proceedings of the International Conference on Multimedia Computing and Systems; pp. 35/-361; Presented in Hiroshima, Japan on Jun. 17-23, 1996.

IBM Technical Disclosure Bulletin; vol. 40; No. 9; Sep. 1997; pp. 79-81.

* cited by examiner

User Account - 142

User Acct ID - 144

Defaults – 146

Preferences – 148

Perm Net Addr – 150

Device Type – 152

Email Address - 154

Figure 5

Parameter Store 802

Network Address 316

Delivery Instructions 318

User Account ID 320

Device Type 322

Web Site Address 804

Figure 8

EDITING AND BROWSING IMAGES FOR VIRTUAL CAMERAS

CROSS-REFERENCE TO RELATED APPLICATION

This application is a continuation application of and claims priority from U.S. patent application Ser. No. 10/322,058, filed on Dec. 17, 2002.

BACKGROUND OF THE INVENTION

1. Field of the Invention

The field of the invention is virtual cameras for digital imaging, or, more specifically, methods, computer program products, and products for making and using virtual cameras to create, edit, and browse digital images.

2. Description of the Related Art

The state of the art of digital photography is that creation of a snapshot using a traditional camera, either a digital camera or a film camera, requires that a camera be physically present near the subject to be photographed at the time when the photograph is to be taken. The requirement for physical presence stems from the need to illuminate a physical imaging device with light reflected from a subject to be photographed or imaged. Physical imaging devices include, for example, charge coupled devices for digital cameras and film in film cameras. Because of the need to illuminate an imaging device with light actually reflected from the subject to be imaged, there is no way in current art to create a snapshot of a subject that is spatially out of view of the camera. Moreover, snapshots in current art are snapshots of an object as it exists at the time of the snapshot. Because of the need to illuminate an imaging device with light actually reflected from the subject to be imaged, there is no way in current art to create a snapshot of a subject at a remote point in time. It would be useful, however, to be able to create a snapshot of a subject not within spatial view of a camera. It would be useful to be able to create a snapshot of a subject as the subject appeared at a time other than the moment when the snapshot is taken. It would also be useful to be able to edit a snapshot of a subject directly by use of the camera from which the snapshot was taken.

SUMMARY OF THE INVENTION

Virtual cameras according to embodiments of the present invention provide methods of digital imaging that include creating, in a virtual camera, an unedited image request for an unedited digital image; editing the unedited image request, producing an edited image request for an edited image; communicating the edited image request to a web site for imaging for virtual cameras; receiving, in the virtual camera, the edited digital image from the web site; and displaying the edited digital image on a display device of a user interface of the virtual camera. Such methods typically include communicating, from the virtual camera to the web site for imaging for virtual cameras, the unedited image request for an unedited digital image; receiving, in the virtual camera, the unedited digital image from the web site; and displaying the unedited digital image on the display device of the virtual camera. In such methods, editing an unedited image request typically further comprises displaying unedited image request data elements on the display device and receiving edited image request data elements from a data entry device of the user interface. In such methods, the image requests typically comprise image request data elements including location coordinates, view direction, date, time, zoom, and exposure.

Virtual cameras according to embodiments of the present invention provide methods of digital imaging that include identifying a browsing image request data element from among image request data elements of an image request data structure; creating, in dependence upon the identified browsing image request data element, a multiplicity of image requests for digital images, wherein each image request comprises an instance of the image request data structure having image request data elements one of which is identified as the browsing image request data element and values of the browsing image request data elements vary among the image requests; communicating each image request from a virtual camera to a web site for imaging for virtual cameras; receiving, in the virtual camera, each digital image from the web site; and displaying each digital image on a display device of the virtual camera. Such methods often include identifying a browsing range of values for the browsing image request data element; identifying one or more browsing interval values in the browsing range for the browsing image request data element; where creating a multiplicity of image requests further comprises creating, for each browsing interval value in the browsing range, an image request, wherein each image request has a browsing image request data element set to a browsing interval value. Such methods often also include identifying a browsing rate, where communicating each image request from a virtual camera to a web site for imaging for virtual cameras is carried out in dependence upon the browsing rate. Such methods also often include receiving at least one 'next-image' command, each 'next-image' command representing an instruction to browse to a next digital image, wherein communicating each image request from a virtual camera to a web site for imaging for virtual cameras further comprises communicating each image request only after receiving a 'next-image' command.

The foregoing and other objects, features and advantages of the invention will be apparent from the following more particular description of exemplary embodiments of the invention, as illustrated in the accompanying drawings wherein like reference numbers represent like parts of the invention.

BRIEF DESCRIPTION OF THE DRAWINGS

FIG. 5 is an example data structure diagram useful in exemplary embodiments of user account records.

FIG. 8 is a data structure diagram illustrating an example embodiment of a parameter store.

DETAILED DESCRIPTION OF EXEMPLARY EMBODIMENTS

Introduction

Figure 1:
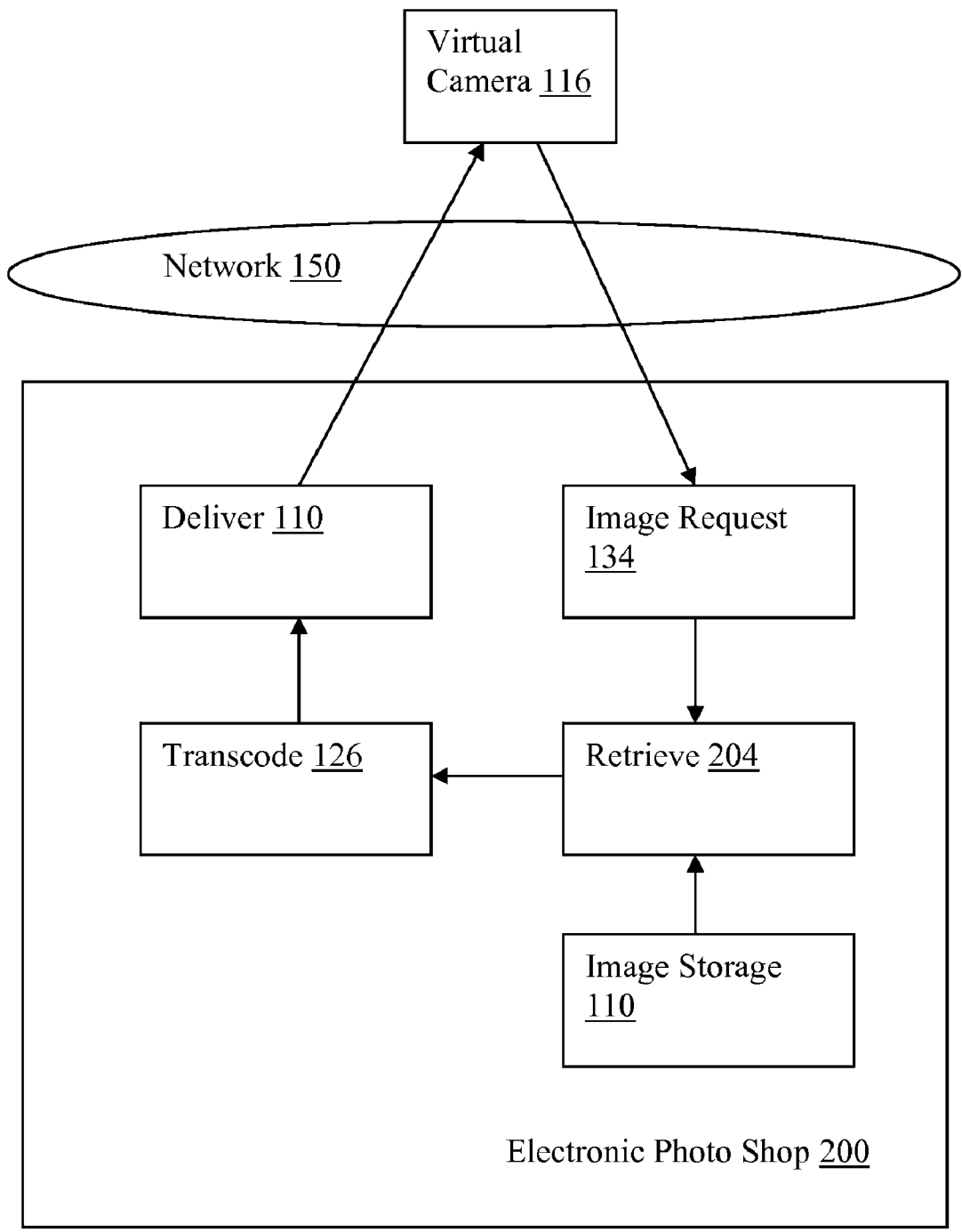
FIG. 1 is a block diagram of a general example embodiment of the system aspect of the invention.

The present invention is described primarily in terms of methods for providing images for virtual cameras and in particular methods for editing and browsing digital images for virtual cameras. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

In this specification, the terms "field," "data element," and "attribute" are used as synonyms, referring to individual elements of digital data. Aggregates of data elements are referred to as "records" or "data structures." Aggregates of records are referred to as "files" or "tables." Aggregates of files are referred to as "databases." Definitions of complex data structures that include member methods, functions, or software routines in addition to data elements are referred to as "classes." Instances of complex data structures are referred to as "objects" or "class objects."

"Browser" means a web browser, a software application for locating and displaying web pages. Browsers typically comprise both a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML and HDML.

"CGI" means "Common Gateway Interface," a standard technology for data communications of resources between web servers and web clients. More specifically, CGI provides a standard interface between servers and server-side 'gateway' programs which administer actual reads and writes of data to and from files systems and databases. The CGI interface typically sends data to gateway programs through environment variables or as data to be read by the gateway programs through their standard inputs. Gateway programs typically return data through standard output. It is typically a gateway program that provides a MIME type in a return message header advising a server, and eventually therefore a browser or other communications client, of the type of data returned from CGI gateway programs.

"Coupled for data communications" means any form of data communications, wireless, infrared, radio, internet protocols, HTTP protocols, email protocols, networked, direct connections, dedicated phone lines, dial-ups, serial connections with RS-232 or Universal Serial Buses, hard-wired parallel port connections, and other forms of data communications as will occur to those of skill in the art.

Couplings for data communications wireless modems using analog cellular channels, and communications using CDPD, Cellular Digital Packet Data. Couplings for data communications include wireless access points, wireless network ports according to IEEE standard 802.11, and Bluetooth piconet ports as standardized by the Bluetooth Special Interest Group, and HomeRF ports as standardized by the HomeRF Working Group, as well as infrared ports. Couplings for data communications include Bluetooth piconets implemented in accordance with the well known de facto industry standard known as the "Bluetooth Specification," a specification for short range radio links among mobile personal computers, mobile phones, and other portable devices.

"HTML" stands for 'HypterText Markup Language,' a standard markup language for displaying web pages on browsers.

"HTTP" stands for 'HyperText Transport Protocol,' the standard data communications protocol of the World Wide Web.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among virtual cameras, electronic photo shops, and devices coupled through designated network addresses is well within the scope of the present invention. In embodiments of the kind illustrated, virtual camera typically includes devices implemented as automated computing machinery, a web browser, and an internet client having a network address. There is no requirement within the present invention that the internet client have any particular kind of network address.

"Network address" means any network address useful to locate a virtual camera or a designated network address on any network. Network address includes any internet protocol address useful to locate an internet client, a browser, a virtual camera, or a designated network address on the Internet. Network addresses useful with various embodiments of the invention include local internet protocol addresses, private internet protocol addresses, and temporary Internet addresses assigned to a web client by a DHCP server, and permanent, official registered Internet addresses associated with domain names.

"Server" in this specification refers to a computer or device comprising automated computing machinery on a network that manages network resources. A "web server" in particular is a server that communicates with browsers by means of HTTP in order to manage and make available to networked computers markup language documents and digital objects.

A "store" is one or more storage locations in computer memory. "Storing" is writing data to storage locations in computer memory, typically implemented by a processor operating under stored program control.

A "URI" or "Universal Resource Identifier" is an identifier of a named object in any namespace accessible through a network. URIs are functional for any access scheme, including for example, the File Transfer Protocol or "FTP," Gopher, and the web. A URI as used in typical embodiments of the present invention usually includes an internet protocol address, or a domain name that resolves to an internet protocol address, identifying a location where a resource, particularly a web page, a CGI script, or a servlet, is located on a network, usually the Internet. URLs directed to particular resources, such as particular HTML files, JPEG files, or MPEG files, typically include a path name or file name locating and identifying a particular resource in a file system coupled to a network. To the extent that a particular resource, such as a CGI file or a servlet, is executable, for example to store or retrieve data, a URI often includes query parameters, or data to be stored, in the form of data encoded into the URI. Such parameters or data to be stored are referred to as 'URI encoded data.'

"URI encoded data" is data packaged in a URI for data communications. In the case of HTTP communications, the HTTP GET and POST functions are often used to transmit URI encoded data. In this context, it is useful to remember that URIs do more than merely request file transfers. URIs identify resource on servers. Such resource may be files having filenames, but the resources identified by URIs also include, for example, queries to databases. Results of such queries do not necessarily reside in files, but they are nevertheless data resources identified by URIs and identified by a search engine and query data that produce such resources. An example of URI encoded data is:

http://www.foo.com/cgi-bin/
MyScript.cgi?field1=value1&field2=value2

This is an example of URI encoded data, which is how variable names and values typically are submitted over the web using HTTP GET request messages. This method using the GET message is useful when the amount of data to be encoded is fairly small. For larger amounts of data, it is more common to use HTTP POST messages for HTML form submissions.

More specifically, the entire example above is a URI bearing encoded data, and the encoded data is the string "field1=value1&field2=value2." The encoding method is to string field names and field values separated by '&' and "="

with spaces represented by '+.' There are no quote marks or spaces in the string. Having no quote marks, spaces are encoded with '+.' For example, if an HTML form has a field called "name" set to "Lucy", and a field called "neighbors" set to "Fred & Ethel", the data string encoding the form would be:

name=Lucy&neighbors=Fred+%26+Ethel

"URLs" or "Universal Resource Locators" comprise a kind of subset of URIs, wherein each URL resolves to a network address. That is, URIs and URLs are distinguished in that URIs identify named objects in namespaces, where the names may or may not resolve to addresses, while URLs do resolve to addresses. Although standards today are written on the basis of URIs, it is still common to such see web-related identifiers, of the kind used to associate web data locations with network addresses for data communications, referred to as "URLs." In this specification, we refer to such identifiers generally as URIs.

"World Wide Web," or more simply "the web," refers to a system of internet protocol ("IP") servers that support specially formatted documents, documents formatted in markup languages such as HTML, XML, WML, or HDML. The term "Web" is used in this specification also to refer to any server or connected group or interconnected groups of servers that implement a hyperlinking protocol, such as HTTP or WAP, in support of URIs and documents in markup languages, regardless whether such servers or groups of servers are coupled to the World Wide Web as such.

A "web site" is a location on the World Wide Web. Web sites are identified by domain names that resolve to Internet addresses. Web sites include storage locations identifiable by URIs. Web sites are implemented in, on, and as part of web servers, that is, HTTP servers. Web sites are aggregations of computer software installed and operating on computer hardware.

Imaging for Virtual Cameras

Turning now to FIG. 1, a first aspect of the invention is seen illustrated as a system for imaging for a virtual camera (116). The embodiment illustrated includes a web site implemented to function as an electronic photo shop (200). The term 'electronic photo shop' is a fanciful descriptive phrase intended to be reminiscent of traditional photo shops where film bearing optical images was sent for developing, printing, and delivery. In an electronic photo shop, by way of analogy, image requests (134) for digital images are sent from a virtual camera (116) to an electronic photo shop (200) for retrieval (204), transcoding (126), and delivery (110). To the extent that they are implemented as web sites, electronic photo shops comprise web servers.

A virtual camera is any device or computer capable of coupling for data communications to an electronic photo shop and transmitting image requests for digital images to the electronic photo shop image requests. Examples of devices useful as virtual cameras according to embodiments of the present invention include personal computers, personal digital assistants, and special purpose devices designed and constructed specifically for use as virtual cameras.

Figure 1A:
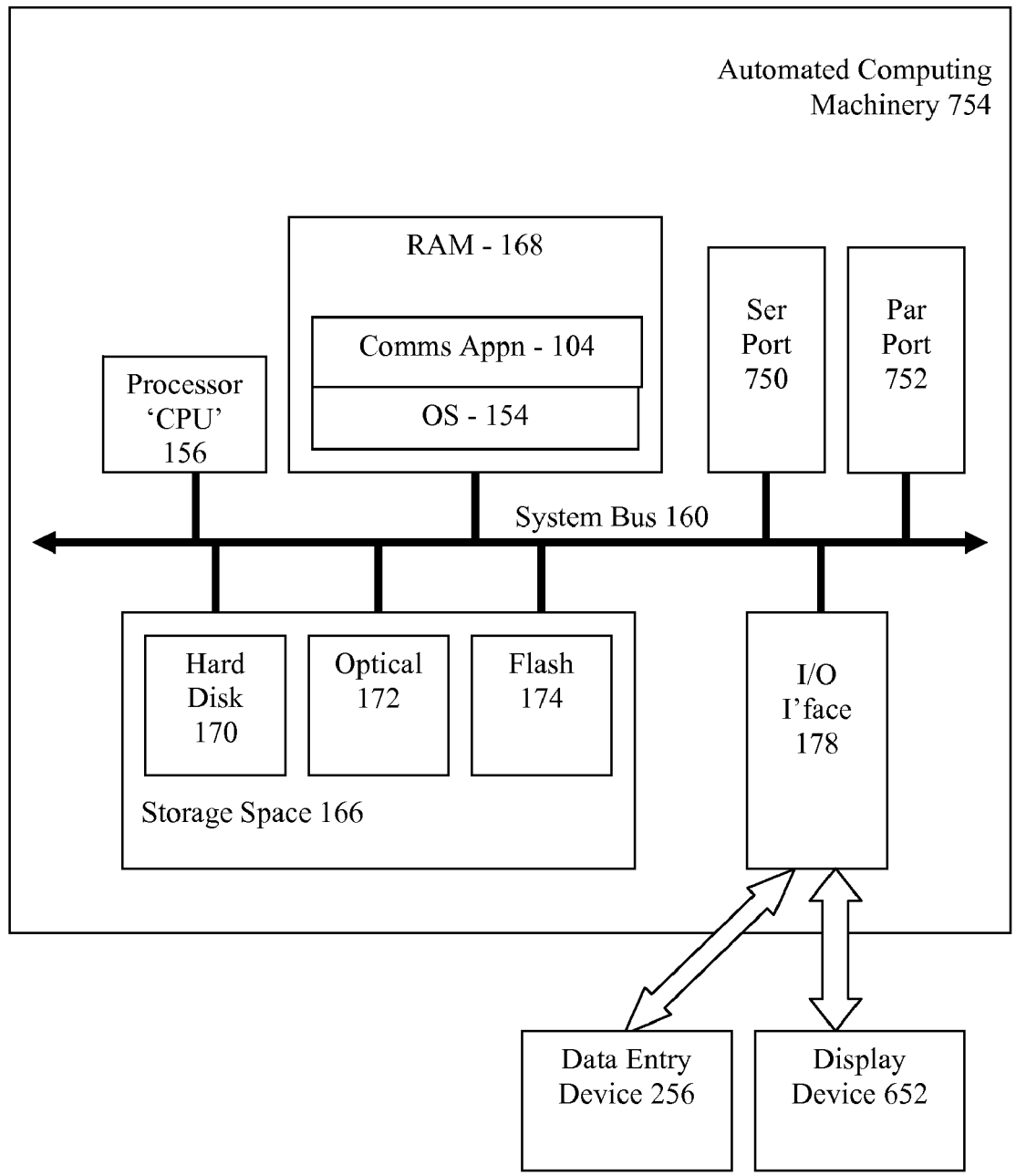
FIG. 1a sets forth a block diagram of automated computing machinery useful in virtual cameras and web sites, including web sites implementing electronic photo shops, according to various exemplary embodiments of the present invention.

Both virtual cameras and web servers upon which electronic photo shops are implemented typically comprise automated computer machinery (754) having elements such as those illustrated in FIG. 1a. FIG. 1a sets forth a block diagram of automated computing machinery (754) that includes a computer processor or 'CPU' (156). The exemplary automated computer machinery (754) of FIG. 1a includes random access memory (168) ("RAM").

Stored in RAM (168), in this example of useful automated computing machinery, is a communications application program (104) and an operating system (154). Examples of communications application programs useful with various embodiments of the invention include HTTP communications programs such as web server software for web servers and browsers and microbrowsers for virtual cameras. Examples of operating systems useful with various embodiments of servers and client devices according to the present invention include Microsoft's DOS, Microsoft's NT™, Unix, Linux, and others as will occur to those of skill in the art. The use of any operating system, or no operating system, is within the scope of the present invention.

In addition to RAM, the exemplary automated computer machinery (754) of FIG. 1a includes non-volatile computer memory storage space (166). Non-volatile storage space (166) can be implemented as hard disk space (170), optical drive space (172), electrically erasable programmable read-only memory space (so-called 'EEPROM' or 'Flash' memory) (174), or as any other kind of computer memory, as will occur to those of skill in the art, capable of receiving and storing software and computer data, including communications applications programs, security objects, operating systems, security control data, security request data, and resources comprising information in the form of computer data.

The automated computer machinery (754) of FIG. 1a includes an input/output interface (178) capable of providing input from data entry devices (256) and output to display devices (652). Data entry devices (256) include mice, touch-sensitive screens, keyboards, and so on. Display devices (652) include video screens on personal computers, liquid crystal screen on wireless handheld devices, audio speakers, television screens, and so on. To the extent that a data entry device (256) and a display device (652) on the same virtual camera or web server comprise a touch-sensitive screen, a data entry device (256) and a display device (652) can be the same physical device. Data entry devices and display devices both implement or utilize GUIs or character-based user interfaces. Automated computer machinery (754) as illustrated in FIG. 1a typically includes also serial ports (750) and parallel ports (752) for additional input/output support. Other hardware components of automated computing machinery often used in virtual cameras and web servers for electronic photo shops but not shown on FIG. 1a include wired Ethernet cards, wireless LAN cards for 802.11 or Bluetooth wireless connections, and USB (Universal Serial Bus) ports.

Figure 4:
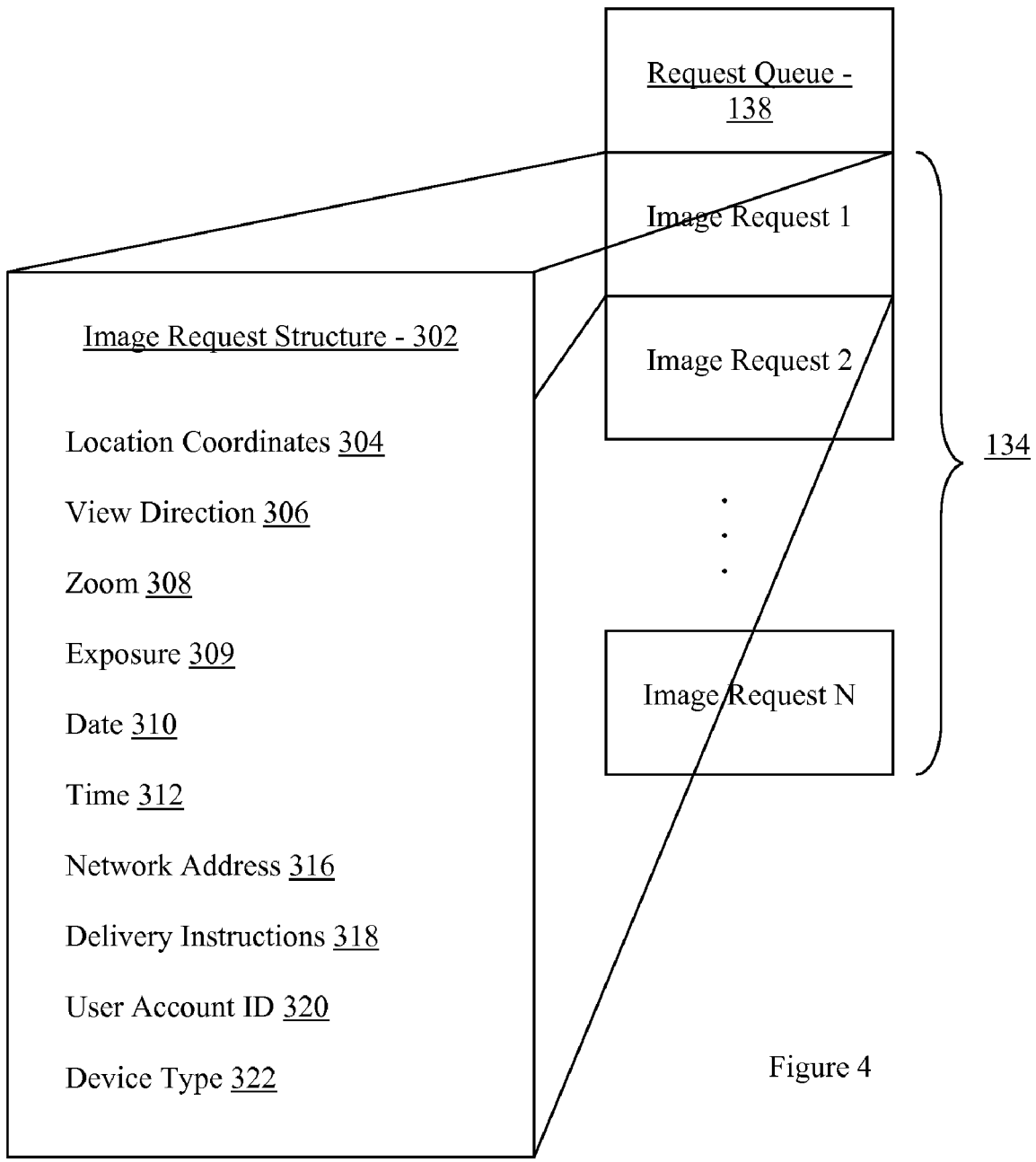
FIG. 4 is an example data structure diagram useful in exemplary embodiments of image requests.

An image request is a data structure representing a request for preparation of a digital image of a view in a particular direction from a particular location. Image requests are communicated across networks to electronic photo shops of the invention. FIG. 4 illustrates example embodiments of data structures useful as image requests in various embodiments of the invention. The example embodiment of image request data structure illustrated in FIG. 4 includes data elements representing location coordinates (304), view direction (306), zoom (308), exposure (309), date (310), time (312), network address (316), delivery instructions (318), user account identification code (320), and a device type (322).

Location coordinates (304) are standard data representations of latitude and longitude, and, optionally, as described below, elevation. View direction (306) typically comprises a standard data representation of a compass direction from the location coordinates to a subject for imaging. In addition to a two-dimensional indication of direction upon the surface of the earth, view direction optionally includes a vertical component such as elevation, declination, or any other measure of vertical view angle.

Zoom (308) is an indication of magnification. Alternatively, zoom is considered an indication of relation between the position of a viewer of an image and the size of the image. In some embodiments, in a fashion analogous to film cameras, zoom is expressed in terms of lens focal length. In embodiments of the present invention that measure zoom in terms of lens focal length, the lens focal length is a conventional or scaled representation in which the standard is generally taken that 45 millimeters gives a 'normal' view, focal lengths of less than 45 millimeters give wide angle views, and focal lengths of more than 45 millimeters give close-up views. The lens focal length is said to be conventional or scaled in such embodiments because, of course, in many such embodiments, using, as they do, virtual cameras, often there are no physical lenses and there are no physical focal lengths.

Exposure (309) is a virtual measure of the darkness or lightness of an image, analogous to what is measured by lens aperture and shutter speed in a film camera. Exposure in embodiments of the present invention, however, is a virtual measure in the sense that, in many embodiments of virtual cameras, there is no actual lens, no lens aperture, no actual shutter, and no shutter speed.

In the detailed example embodiment of image request data structure as illustrated in FIG. 4, date (310) and time (312) are conventional data representations of the date and time of an image retrieved and transcoded into a virtual snapshot. Within the present invention, there is no requirement that the date and time of the image be the date and time of the virtual snapshot. A user of a virtual camera can take a virtual snapshot at noon of a subject with the resulting image being for midnight, and vice versa. A user of a virtual camera can take a virtual snapshot of a public park at noon in July, when the trees are covered with leaves, and specify in the date field of the image request that the image is to be retrieved and transcoded for January 20 at 4:00 p.m. local time, so that the image depicts the park with late afternoon light on a winter day, with no leaves on the trees.

In image request data structures as illustrated in FIG. 4, the network address (316) is an internet protocol address or a web address. In many embodiments, the virtual camera includes a browser, often including a wireless Internet connection. Web addresses in some of these embodiments are dynamically assigned to the virtual camera when the camera's browser connects to the Internet, typically by a download from a DHCP server. In other embodiments of this kind, the virtual camera has a permanently assigned web address associated with the camera, as, for example, a web addressed resolved through a registered domain name.

In image request data structures of the kind illustrated in FIG. 4, delivery instructions (318) include data representations of user choice regarding delivery of a transcoded image, including, for example, whether the image is to be delivered by download directly to the virtual camera, delivered by email, or delivered by recording an image on a recording medium such as a CD or DVD and mailing it to a user.

Many image request data structures of the kind illustrated in FIG. 4 include a user account identification code (320) which is used in various embodiments of the invention to identify user account records that store information regarding user, including, for example, user preferences regarding image processing and delivery and default information regarding device types for particular users. In addition, many image request data structures of the kind illustrated in FIG. 4 include a field identifying a device type (322) for a virtual camera. Device types of virtual cameras useful in typical embodiments include personal computers, personal digital assistants, and special purpose devices designed and constructed specifically for use as virtual cameras. In fact, device types useful as virtual camera include any device or computer capable of coupling for data communications through a network to an electronic photo shop and transmitting to the electronic photo shop, through the network, image requests.

Figure 2:
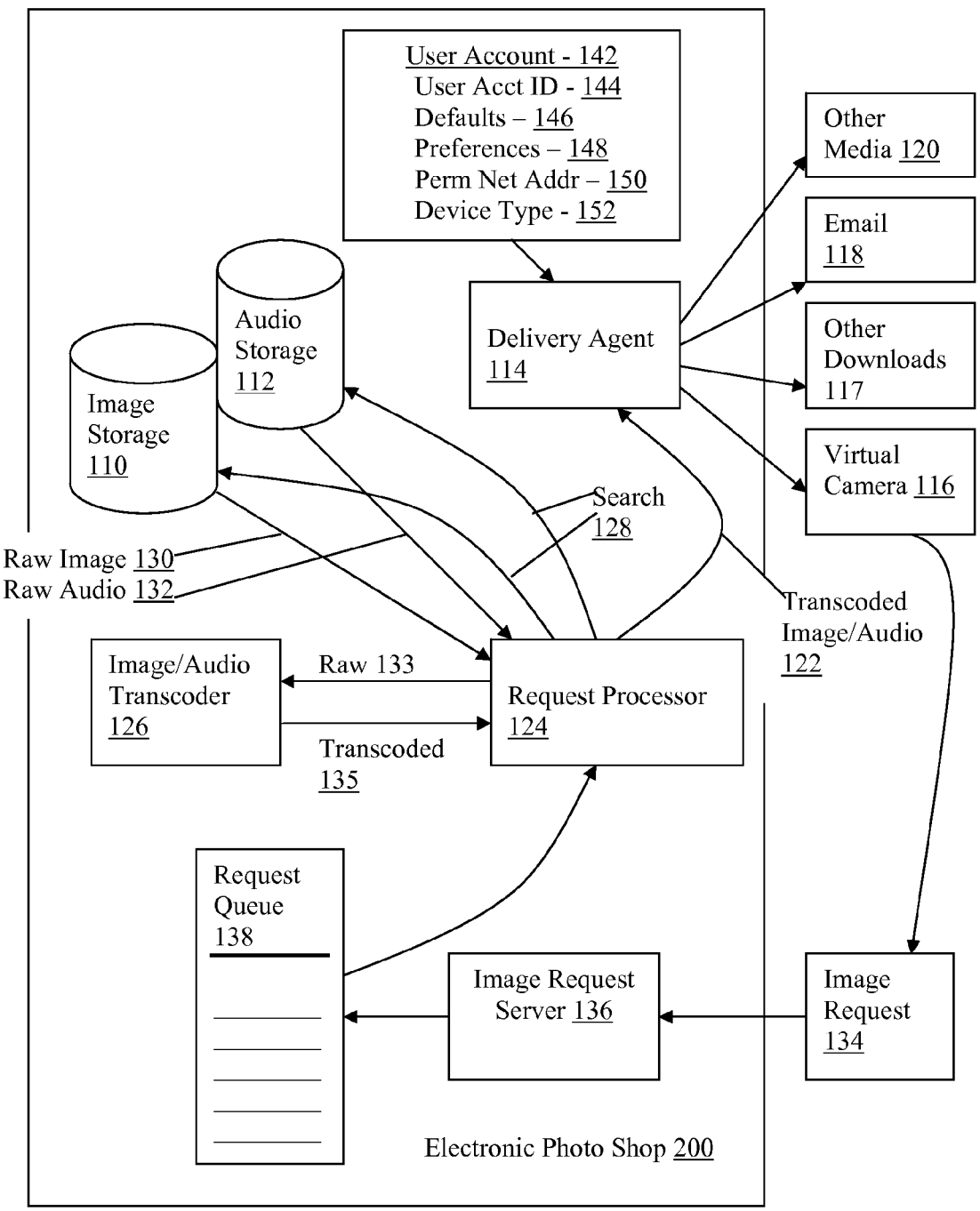
FIG. 2 is a more detailed system diagram illustrating typical example embodiments of the invention.

Turning now to FIG. 2, a more detailed embodiment of the invention is shown as a system for imaging for virtual cameras. The embodiment shown in FIG. 2 is implemented as a web site configured as an electronic photo shop, including an image request server (136). The image request server is software installed and running on computer hardware configured as a server, coupled for data communications to a virtual camera (116), the image request server being programmed to receive image requests (134) and pass them along, for example, through a queue (138), to a request processor (124) for further processing. That is, the image request server (136) can be configured as a web server, an HTTP server, in which receiving image requests (134) comprises receiving HTTP request messages bearing image request data elements encoded as URI encoded data.

In many embodiments of the present invention, an electronic photo shop can provide audio clips to accompany transcoded images. In embodiments of the kind shown in FIG. 2, audio files are stored (112) in computer memory in a fashion similar to image storage (110). Such computer memory stores (112, 110) are databases containing digital audio and image files, or pointers to actual locations of such files, indexed or sorted according to various pertinent attributes, including, for example, location coordinates and view direction. Such computer memory stores in some embodiments are sorted or indexed also according to zoom, exposure, date, or time. Such computer memory stores are in various embodiments sorted or indexed in other ways as will occur to those of skill in the art, all such ways being well within the scope of the present invention.

Typical embodiments of the kind shown in FIG. 2 include a request processor (124). The request processor is a software subsystem installed and running on computer hardware, the request processor programmed to search (128) audio and video stores (110, 112), and retrieve from such computer memory stores, raw images (130) and raw audio clips (112) corresponding to an image request. In typical embodiments, a request processor then provides the raw images and audio clips to a transcoder (126) for transcoding. The transcoder (126) transcodes the images and audio and returns transcoded images and transcoded audio (135) to the request processor. The request processor then typically provides the transcoded images and audio clips to a delivery agent (114) for delivery in accordance with user instructions or preferences.

In typical embodiments of the kind shown in FIG. 2, a transcoder (126) is a software subsystem installed and running on computer hardware and programmed to receive raw audio and a raw image (133) and transcode them according to an image request. That is, the transcoder typically will adjust an image to accord with the zoom, exposure, date, time, and device type in accordance with the values of these fields in an image request. Device type indications include, for example, whether a particular virtual camera supports audio, whether a particular virtual camera has a display screen, the size of the display screen on the virtual camera, whether the display screen on a virtual camera supports color, and so on.

In addition to transcoding according to data element values in an image request, the transcoder also operates in dependence upon user preferences (148) and defaults (146) set in user account records (142). That is, for example, in the embodiment shown in FIG. 2, the transcoder (126) infers zoom, exposure, date, and time from user preferences in the absence of a setting for zoom, exposure, date, and time in the image request. That is, for example, a user sets in defaults or preferences in the user's account information (142) that in the absence of a zoom entry in an image request, the transcoder is to set the zoom to 25 millimeters, a wide angle view. This alternative is useful when, for example, the raw image is recorded in storage with a normal view corresponding to a 45 millimeter focal length, which would be provided in the transcoded image, in the absence of an entry in the image request, but for the user preference or default setting.

Similarly, defaults are set for date and time, so that, for example, in the absence of a setting in the image request, the transcoder defaults to producing images based upon the date and time when the image request is received. This example default setting for date and time, of course, is analogous to operation of a physical camera which makes snapshots of subjects as the subjects appear at the time of the snapshot.

Alternatively, for example: A user wants a series of images of subjects as they appear at 10:00 p.m. local time, but is only able to visit the location of the subject at 10:00 a.m. The user then sets a time default on the user's account to 10:00 p.m. and conveniently submits a series of image requests at 10:00 a.m. without bothering to enter time values for each request. Then the transcoder transcodes all the images in this example series to appear as if illuminated by light conditions normally prevalent at 10:00 p.m.

The example embodiment illustrated in FIG. 2 includes a delivery agent (114). The delivery agent in the example embodiment received the transcoded image, optionally with an audio clip, from the request processor (124). The delivery agent also is passed either a pointer to the image request or a copy of the image request. Either way, the delivery agent carries out its work in dependence upon the data in the image request, and, by reading a user account identification code from the image request, as at reference (320) on FIG. 4, the delivery agent also has access to user defaults (146) and preferences (148) regarding delivery. Users override defaults and preferences by including delivery instructions (reference 318 on FIG. 4) in image requests. Thus users through defaults, preferences, and delivery instructions effects delivery of transcoded images through any combination of downloads from the delivery agent (114) to a virtual camera (116); from the delivery agent (114) to other media such as CDs or DVDs and then through regular mail or courier services to a user's physical address; from the delivery agent through email to an email address (118), either the user's email address or any other email address at the user's option; and from the delivery agent (114) directly to other network addresses.

In various embodiments, server-side software and hardware, including electronic photo shops, commercial Websites, delivery agents, and request processors are coupled for data communications to virtual cameras, not necessarily at the same time, but at one time or another. The couplings for data communications take various forms depending on the embodiment, including for example, wireless network connections as well as standard USB (Universal Serial Bus) cable connections or RS-232 (EIA232) connections. The phrase "coupled for data communications" is defined above in this specification, although the definition is not limiting. Other forms of coupling for data communications will occur those of skill in the art, and all such forms are well within the scope of the present invention.

Downloading from the delivery agent (114) to the virtual camera typically includes downloading across a coupling for data communications to a particular network address where the virtual camera is located on a network, in many embodiments an internet, although the use of other kinds of networks is well within the scope of the invention. In many embodiments, a network address for a virtual camera is communicated to the delivery agent through a network address (reference 316 on FIG. 4) data element in an image request, particularly useful with temporary internet addresses dynamically assigned to the virtual camera by a DHCP server. In other embodiments, a virtual camera has a permanently registered internet address and a domain name, either or both on file (150) in a users account data record (142) in the electronic photo shop, which the deliver agent retrieves on the basis of the user's account identification (320 on FIG. 4) read from the image request. Similarly, in various embodiments, the user's email address or alternative email addresses are communicated to the delivery agent through delivery instructions (318 on FIG. 4) in image requests or retrieved from user account records (142).

As mentioned above, however, network couplings are not required as such. Embodiments are well within the invention that simply connect a virtual camera through a USB cable to a computer having a delivery agent running upon it, for purposes of downloading images to a virtual camera. For purposes of communicating image requests from a virtual camera to an image processor or electronic photo shop, it is well within the invention for embodiments simply to connect the camera through a USB cable or RE-232 cable to a computer having running upon it an electronic photo shop or an image request processor.

Figure 3:
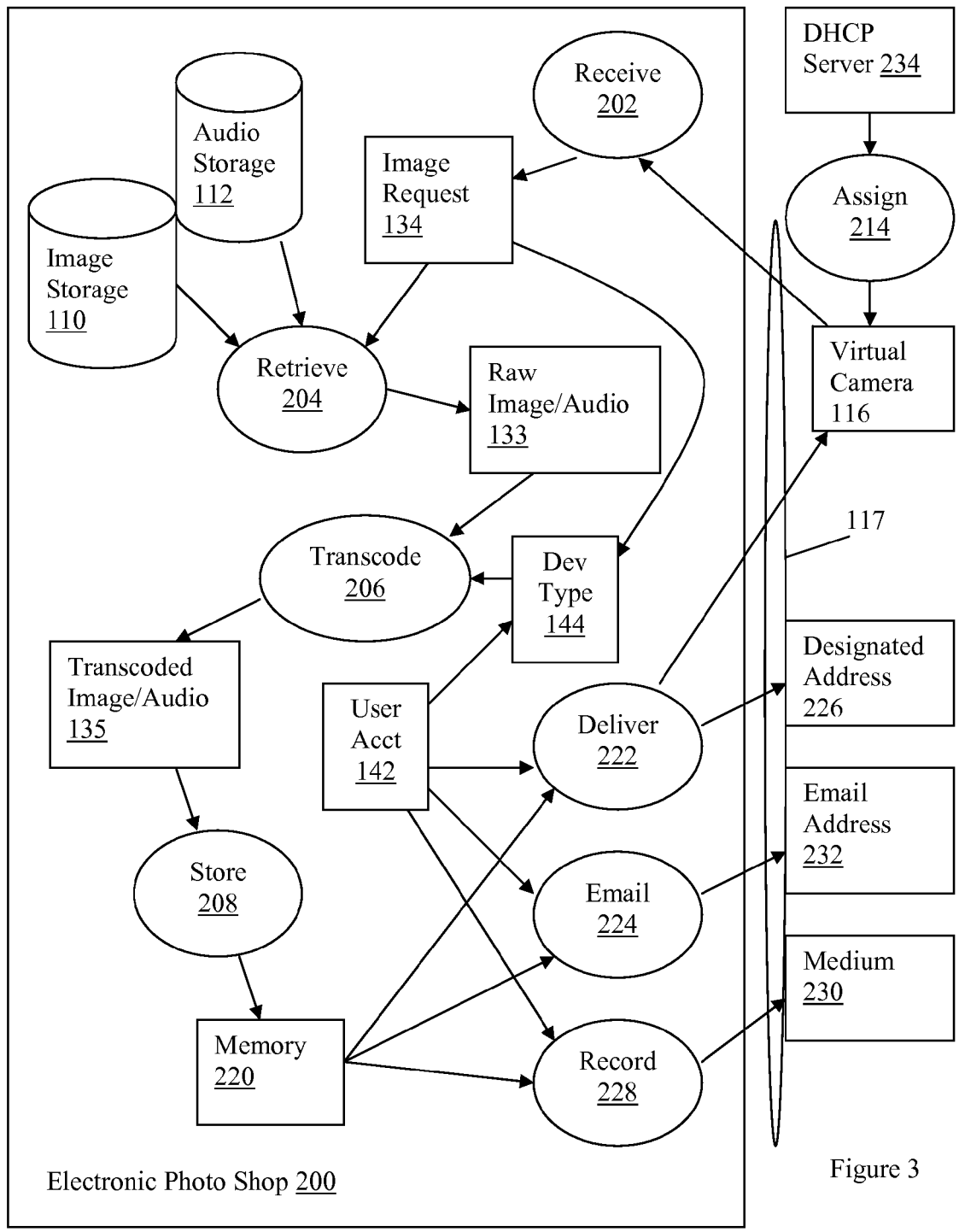
FIG. 3 is a control flow diagram illustrating method aspects of typical embodiments.

Turning now to FIG. 3, a further embodiment of the invention is shown as an example method of imaging for virtual cameras implemented through a web site called an electronic photo shop. The embodiment shown in FIG. 3 includes receiving (202) in an electronic photo shop (200), from a virtual camera (116) coupled for data communications through a network (117) to the electronic photo shop, an image request (134). In typical embodiments, the image request includes a data structure including data elements specifying location coordinates and view direction (as shown at references 304 and 306 on FIG. 4). Receiving (202) an image request (134) in an electronic photo shop implemented as a web site on a web server can be carried out by receiving image requests (134) implemented as HTTP request messages bearing image request data elements encoded as URI encoded data.

The illustrated example embodiment includes retrieving (204), in dependence upon the location coordinates and view direction, from among stored images (110), a raw image (133); transcoding (206) the raw image; and storing (208) the transcoded image in computer memory (220). In some embodiments of electronic photo shops implemented as web sites, retrieving (204) a raw image (133) is carried out through a CGI program identified by a URI in an image request implemented as an HTTP request message. The CGI program in such embodiments carries out a database query among stored images (110) using image request data elements, such as, for example, location coordinates and view direction, as search parameters. In such exemplary embodiments, the search parameters are provided as URI encoded data in an image request implemented as an HTTP request message.

For further explanation, here is an example of URI encoded image request data elements of a kind that can usefully be provided to a CGI script for image retrieval through an HTTP request message:

http://www.photoshop.com/cgi-bin/ImageRetrieve.cgi?latitude=39&longitude=77&direction=270

The exemplary URI encoded image request data elements are elements of an image request for location coordinates of latitude 39 degrees and longitude 77 degrees with a view direction of 270. This particular example of location coordinates, latitude and longitude is near downtown Washington, D.C., and the view direction is due west. Possibly this image request retrieves a view with the Potomac River in the background.

In typical embodiments of the kind illustrated in FIG. 3, the image request (134) further includes a device type (144) for the virtual camera and transcoding (116) is carried out in dependence upon the device type. The device type typically identifies such device attributes as whether the device supports graphic display, display screen size, whether the device supports color, whether the device supports audio, and so on. Other attributes of devices to be used as virtual cameras will occur to those of skill in the art, and the use of all such attributes is well within the scope of the present invention. In typical embodiments, the image request (134) further includes a user account identification code (as shown at reference 144 on FIG. 5). Typical embodiments, as shown in FIG. 3, include inferring a device type from user account records (142) in dependence upon the account identification code (144), and transcoding (206) in dependence upon the device type. Inferring a device type from user account records typically includes reading the account identification code from an image request, finding a user account record with the same account identification code, and reading from that user account record a device type.

As shown in FIG. 3, typical embodiments of the invention include delivering (222) a transcoded image (135) through a network (117) to a virtual camera (116). In many embodiments, the network (117) is an internet, the electronic photo shop is implemented as a web server or includes a web server, the virtual camera includes a browser, and delivering the transcoded image (135) through the network (117) to the virtual camera (116) includes delivering the transcoded image through the network to the virtual camera by use of HTTP messages. In typical embodiments the image request (134) includes a network address (as shown at reference 316 on FIG. 4) and delivering the transcoded image through the network to the virtual camera further includes delivering the transcoded image through the network to the virtual camera at the network address.

Typical embodiments of the invention include coupling for data communications the virtual camera to the electronic photo shop, wherein coupling for data communications the virtual camera to the electronic photo shop includes dynamically assigning (214) the network address. Dynamically assigning the network address includes receiving a temporary network address in accordance with protocols from a DHCP server, meaning a Dynamic Host Configuration Protocol server.

In typical embodiments, the image request (134) includes a user account identification code (as at reference 320 on FIG. 4). Typical embodiments include inferring, in dependence upon the account identification code, from user account records, a permanent network address (as at reference 150 on FIG. 5) for the virtual camera (116). In this sense, inferring a permanent network address includes reading an account identification code from an image request (as reference 320 on FIG. 4), finding a user account record with the same account identification code (as reference 144 on FIG. 5), and reading a permanent network address (reference 150 on FIG. 5) from the user account record.

In typical embodiments, delivering the transcoded image (135) through the network (117) to the virtual camera (116) includes delivering the transcoded image through the network to the virtual camera at the permanent network address. Typical embodiments also include delivering (222) the transcoded image (135) through the network to a designated network address (226), the designated network address being, for example, some network address other than the network address of the virtual camera. Examples of designated network addresses useful with the present invention include storage locations on user's web sites identified by URIs including domain names resolving to network addresses. Many other forms of designated network addresses other than the network address of a virtual camera will occur to those of skill in the art, and the use of all such alternative forms of designated network addresses is well within the scope of the present invention.

Typical embodiments, as shown on FIG. 3, further include optional additional modes of delivery such as emailing (224) the transcoded image (135) and recording (228) the transcoded image (135) on a recording medium (230). Other modes of delivery will occur to those of skill in the art, and all such modes of delivery of transcoded images and audio are well within the scope of the present invention.

Typical embodiments of the kind illustrated in FIG. 3 include retrieving (204), in dependence upon the location coordinates and view direction, from among stored audio files (112), a raw audio file (133); transcoding (206) the raw audio file; and storing the transcoded audio file (135) in computer memory (220). Typical embodiments include delivering (222) the transcoded image and the transcoded audio file (135) to the virtual camera (116) through the network by use of HTTP messages and delivering (222) the transcoded audio file through the network to a designated network address (226). Typical embodiments further include emailing (224) the transcoded audio file and recording (228) the transcoded audio file on a recording medium (230).

Virtual Camera

Figure 6:
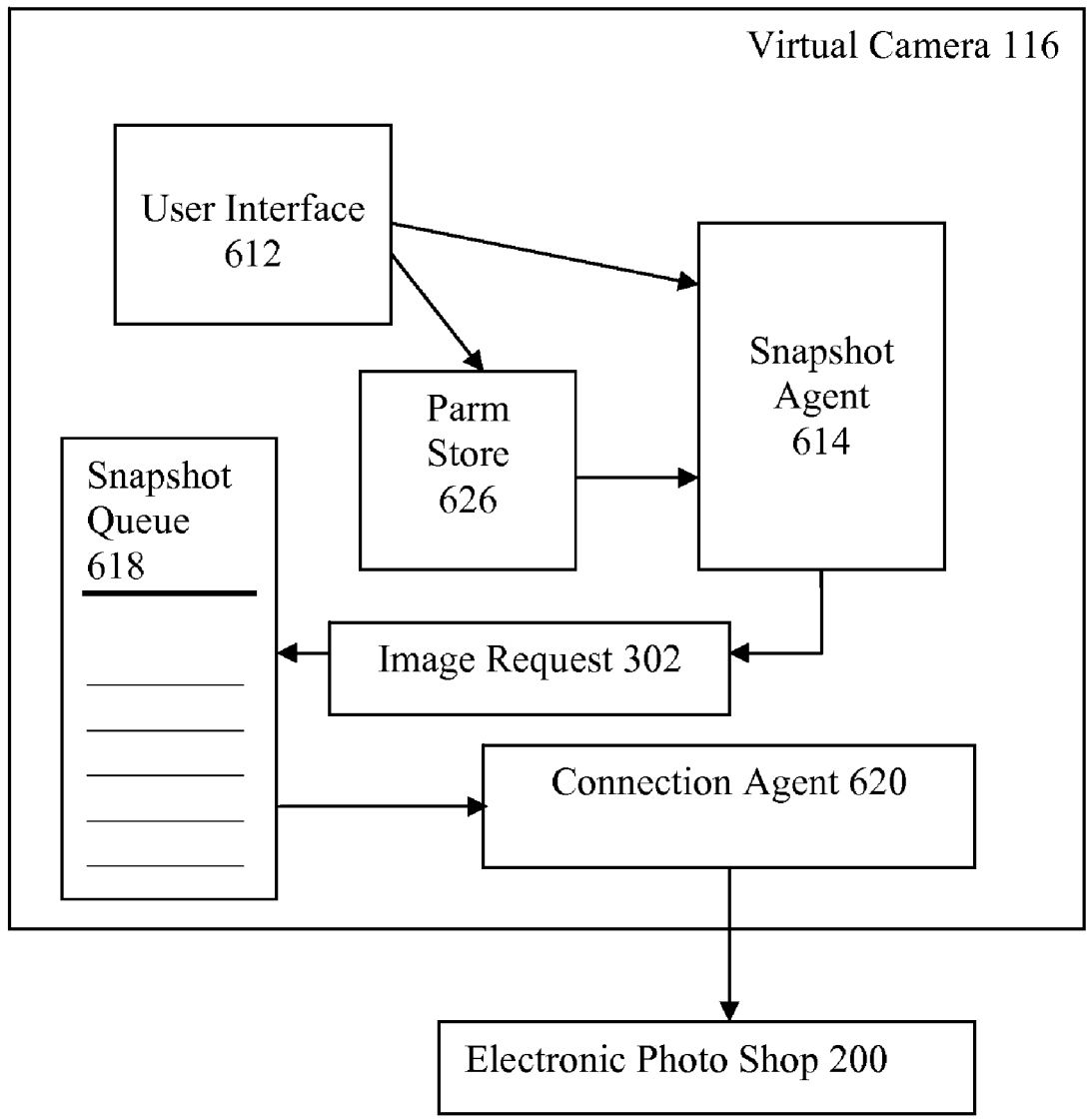
FIG. 6 is a block diagram of an example embodiment of a virtual camera including an example connection to an electronic photo shop.

Turning now to FIG. 6, a further aspect of the invention is shown as a virtual camera (116). A typical exemplary virtual camera of the present invention is automated computing machinery comprising one or more microprocessors coupled to computer memory, with one or more software agents installed and running upon the microprocessors. The illustrated embodiment of FIG. 6 includes a user interface (612), a parameter store (626), a snapshot agent (614), a snapshot queue (618), and a connection agent (620).

Embodiments of virtual cameras include a wide variety of physical forms, ranging, for example, from personal computers to personal digital assistants to elaborate purpose built devices. In embodiments as personal computers, examples of user interfaces (612) include mice, display screens, keyboards, and so on. In embodiments as personal digital assistants, user interface (612) includes keypads, touch-sensitive screens, and liquid crystal displays.

Parameter stores (626) in typical embodiments are computer memory dedicated to storing default values for image request data elements. Snapshot queues (618) are computer memory dedicated to storing one or more image requests. Snapshot agents are collections of computer programs capable of creating image requests (302); gathering and writing into the image requests the image request data elements needed to comprise a request for an image to be directed to an electronic photo shop; and storing the image requests in a snapshot queue to await transmission to the electronic photo shop.

Figure 7:
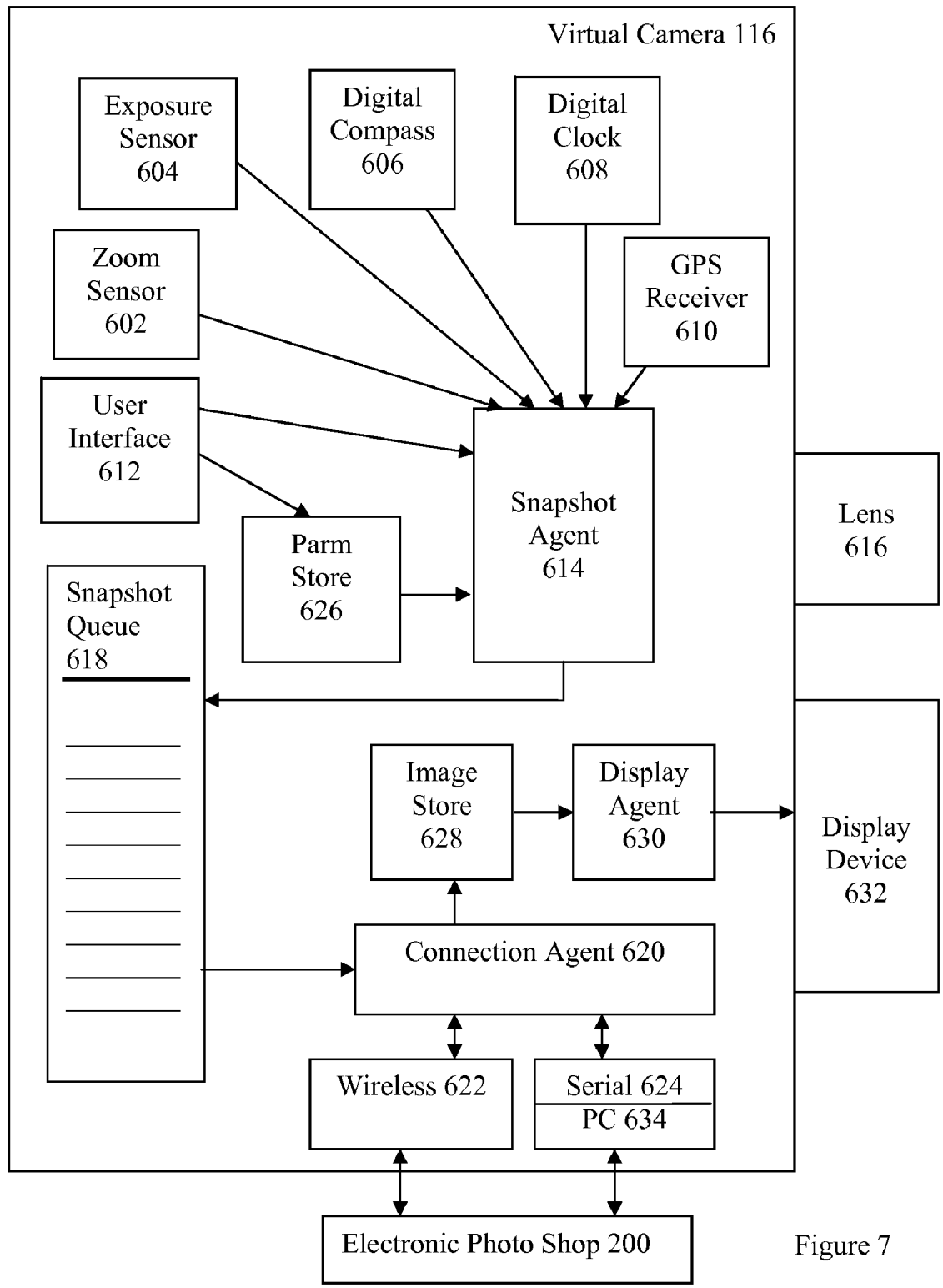
FIG. 7 is a block diagram of a more detailed example embodiment of a virtual camera, also including connections to an electronic photo shop.

A connection agent (620) in typical embodiments is one or more computer programs capable of retrieving image requests from a snapshot queue (618) and communicating the image requests to an electronic photo shop (200). As illustrated in FIG. 7, some embodiments of virtual cameras include display devices (632) capable of displaying digital images. In such embodiments, connection agents (620) typically include also the capability of receiving requested digital images (628) back from an electronic photo shop and passing the digital images to a display agent (630) for display on the display device. Display agents in such embodiments typically comprise one or more computer programs capable of retrieving digital images from digital image storage (628) and displaying them on a display device (632) comprising part of the virtual camera (116). Examples of display devices useful with the present invention include video screens and liquid crystal displays. There are many display devices useful with the present invention that will occur to those of skill, and all such devices are well within the scope of the present invention.

Some embodiments of the present invention support entry through a user interface (612) of one or more, in some embodiments, all, of the image request data elements needed to create an image request. Such embodiments include, for example, personal computers, in which users can simply type in location coordinates, view direction, zoom, exposure, and so on, regardless of the physical location of the subject of an image request or snapshot and regardless of the physical location of the virtual camera. To use such an embodiment, a user can read location coordinates and view direction off a map, for example, and then simply type them in through a user interface. Such embodiments have little or no resemblance in form or function to a film camera. Other embodiments, however, tend more to resemble film cameras in form and function, having for example, viewers and data acquisition systems capable of automating the generation of image request data elements. FIG. 7 illustrates one such more detailed embodiment.

The more detailed embodiment illustrated in FIG. 7 includes a GPS receiver (610), that is, a Global Positioning System receiver, capable of providing precise location coordinates in digital form. In the more detailed embodiment shown in FIG. 7, a snapshot agent is programmed to read location coordinates directly from a GPS receiver integrated directly into the virtual camera itself. Similarly, the embodiment of FIG. 7 includes an electronic digital clock from which the snapshot agent is programmed to read directly the date and time of a snapshot or image request. The embodiment of FIG. 7 includes an electronic digital compass (606) from which the snapshot agent (614) is capable of reading directly the view direction of the virtual camera at the time when an image request is created. The embodiment of FIG. 7 includes an electronic exposure sensor (604) from which the snapshot agent (614) is capable of reading directly an exposure value. The embodiment of FIG. 7 includes an electronic zoom sensor (602) from which the snapshot agent is capable of reading directly a zoom value.

GPS receivers, electronic digital compasses, electronic exposure sensor, and the like, are optional additional features that tend to improve usefulness of a virtual camera for many purposes, although adding such features may increase the cost of particular embodiments. It is a useful advantage of many embodiments of the present invention, however, that virtual cameras can be very cost effective with respect to the quality of image to be produced, because the image quality is totally unrelated to the physical qualities of the virtual camera. More specifically, image quality is determined entirely in the electronic photo shop. This fact cuts hard against obsolescence of particular embodiments of virtual camera because advancements in imaging technology are embodied in electronic photo shops, not in the cameras.

As shown in FIG. 7, virtual cameras in typical embodiments include wireless (622) or serial (624) means for coupling for data communications to an electronic photo shop (200). Serial couplings (624) include couplings through ordinary serial or parallel ports on personal computer (634), as well as the newer USB connections, or Universal Serial Bus connections, capable of data transfer rates of up to 480 Mbps.

In addition to wired coupling through serial or parallel ports, many embodiments support wireless couplings for communications of image requests and return of requested images. Some wireless couplings are fairly location specific, such as Bluetooth, 802.11 connections, and infrared connections, in which the virtual camera would need to be fairly close to a personal computer or other device having a compliant wireless access point in order to effect a coupling for data communications. In such embodiments, as in the wired serial couplings, the virtual camera connects through the coupling to a personal computer, for example, which in turn connects to, for example, the Internet, and communicates one or more image requests to one or more electronic photo shops on the Internet. In such embodiments, it is typical for a user to take more than one snapshot in the form of stored image requests waiting in a snapshot queue on board a virtual camera, connect the virtual camera to a personal computer, and upload the image requests for processing at an electronic photo shop.

In other embodiments, wireless (622) means for coupling for data communications include wireless modems on analog cell phone channels or CDPD channels. CDPD, a digital data transmission technology developed for use on cellular phone frequencies, offers data transfer rates of up to 19.2 Kbps, quicker call set up compared to analog, and better error correction than using modems on an analog cellular channel. The advantage of embodiments using wireless modems, on analog channels or CDPD, is that connections a virtual camera to an electronic photo shop are effected at any time, so long as the virtual camera is in an area covered by cellular phone service.

In addition to analog cell phone channels and CDPD, other long range wireless technologies are useful with various embodiments of virtual camera, including, for example, GPRS or General Packet Radio Service, a standard for wireless communications which runs at speeds up to 150 kilobits per second, and GSM or Global System for Mobile Communications, which operates typically at 9.6 kilobits per second. Other ways of effecting long range wireless couplings for data communications between virtual cameras and electronic photo shops will occur to those of skill in the art, and all such ways are well within the scope of the present invention.

Figure 10:
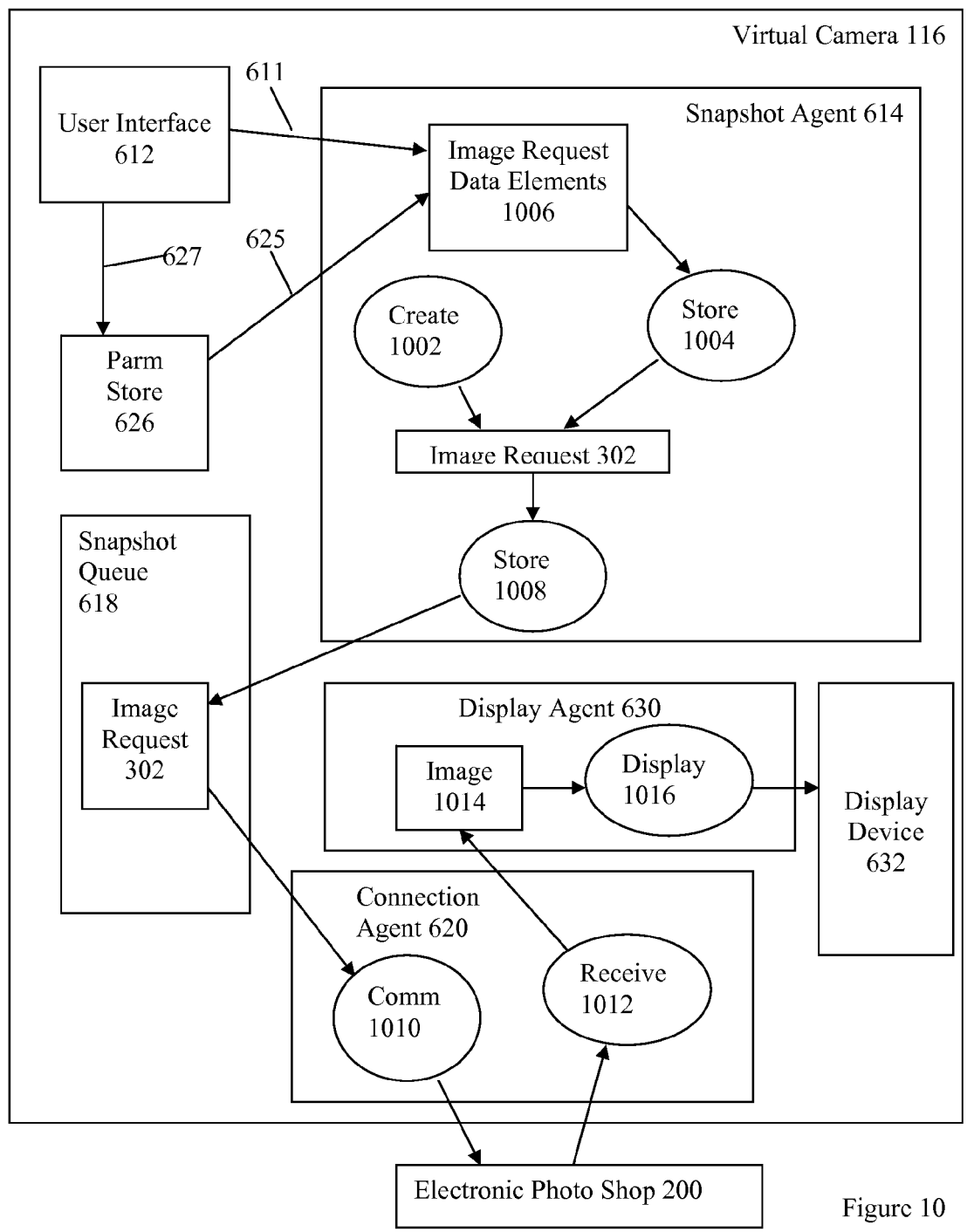
FIG. 10 is a control flow diagram illustrating method aspects of exemplary embodiments of virtual cameras.

Turning now to FIG. 10, a further aspect of the invention is illustrated as a method of digital imaging. In typical embodiments, the method is implemented through use of a virtual camera (116), wherein the virtual camera includes automated computing machinery operating under software program control, and a user interface (612). Typical embodiments include creating (1002) an image request (302) for a digital image and storing (1004) the image request data elements in the image request.

In typical embodiments of the invention, as shown in FIG. 4, the image request includes an image request data structure representing and describing the digital image, the image request data structure includes image request data elements (302), and the image request data elements include data elements for location coordinates and a data element for view direction (304, 306). In further embodiments, the image request data elements also include data elements for zoom (308), exposure (309), date (310), and time (312). In still further embodiments, the image request data elements include data elements for a network address of the virtual camera (316), delivery instructions (318), a user account identification code (320), and a device type (322).

Turning back to FIG. 10, typical embodiments of the invention are seen to include acquiring (611) at least one of the image request data elements (1006) through the user interface (612). In some embodiments, the user interface (612) includes a computer video screen and keyboard on a personal computer. In other embodiments, the user interface (612) comprises a touch-sensitive pad on a personal digital assistant. In typical embodiments, the virtual camera includes a parameter store (626), the parameter store including non-volatile computer memory. Typical embodiments of the invention also include acquiring (615) at least one of the image request data elements from a parameter store (626).

Typical embodiments of the kind illustrated in FIG. 10 include entering (627) through a user interface (612), into the parameter store, default values for the image request data elements, the default values having in the parameter store, for example, a data structure as illustrated in FIG. 8. Typical embodiments also include storing the image request in a snapshot queue (618), the snapshot queue comprising computer memory in the virtual camera. Typical embodiments further include coupling, for data communications, the virtual camera to a web site for imaging for virtual cameras (200) and communicating (1010) the image request (302) from the virtual camera to a web site for imaging for virtual cameras (200). Communicating (1010) an image request (302) to an electronic photo shop implemented as a web site on a web server, for example, can be carried out by communicating an image request (302) implemented as an HTTP request message bearing image request data elements encoded as URI encoded data.

In some embodiments, the virtual camera includes a display device (632), and the method of the invention includes receiving (1012) a digital image (1014) from the web site (200) and displaying (1016) the digital image on the display device (632). In embodiments in which the electronic photo shop (200) is implemented as a web site, receiving (1012) a digital image (1014) can be carried out by receiving an HTTP response message with the digital image appended in the form of a GIF file or a JPEG file, for example.

Figure 11:
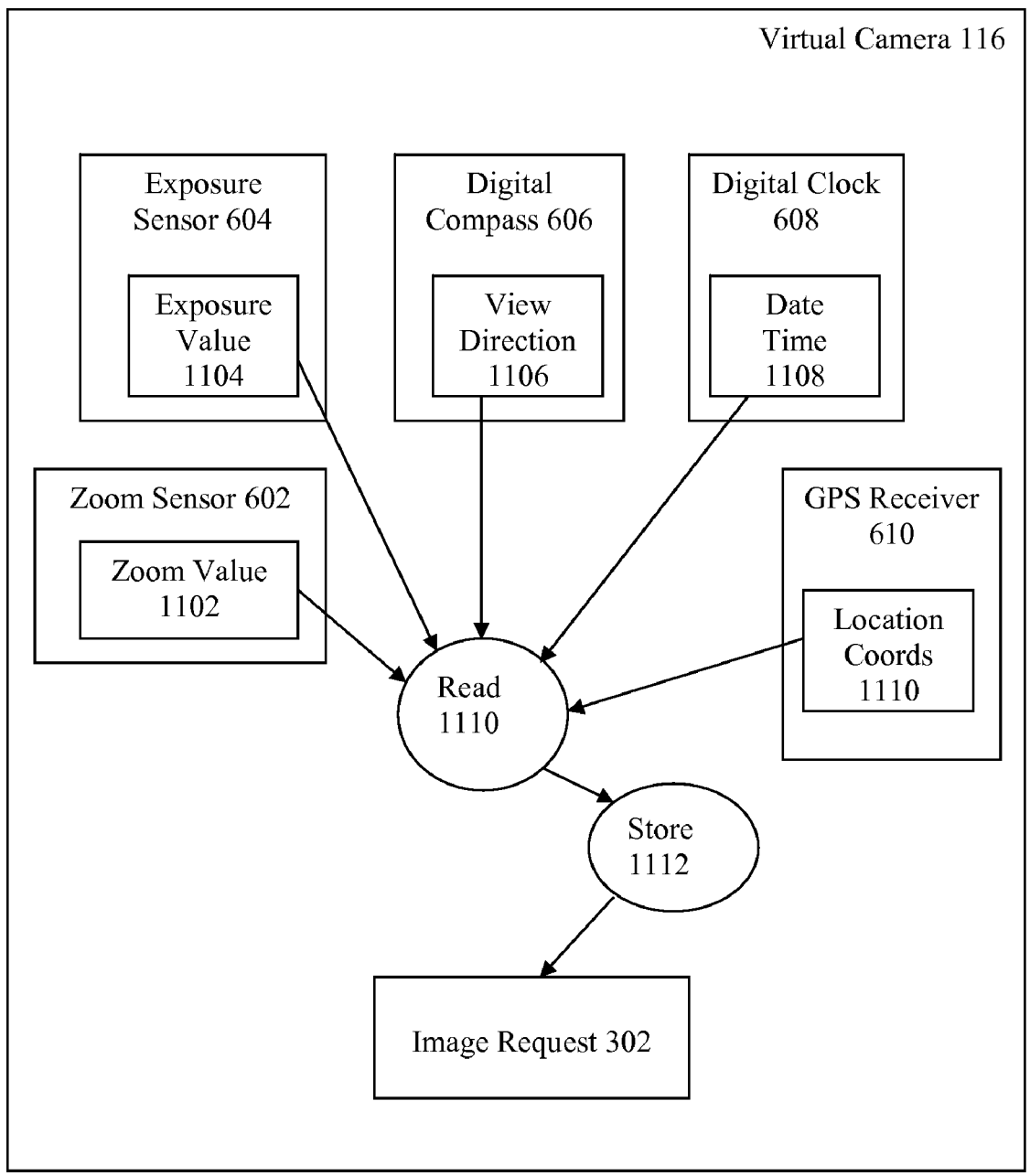
FIG. 11 is a more detailed control flow diagram illustrating method aspects of exemplary embodiments of virtual cameras.

In some embodiments of the kind illustrated in FIG. 11, the image request data elements include at least one data element for location coordinates and the virtual camera includes a GPS receiver (610). Such embodiments typically include reading (1110) location coordinates values (1110) from the GPS receiver and storing (1112) the location coordinates values in the image request (302). In other embodiments, the image request data elements also include a data element for view direction, and the virtual camera includes a digital compass (606). Such embodiments typically include reading (1110) a view direction value (1106) from the digital compass and storing (1112) the view direction value in the image request (302). In many embodiments, the image request data elements further include data elements for date and time, and the virtual camera includes a digital clock (608). Such embodiments typically include reading (1110) date and time values (1108) from the digital clock and storing (1112) the date and time values in the image request (302).

Figure 9:
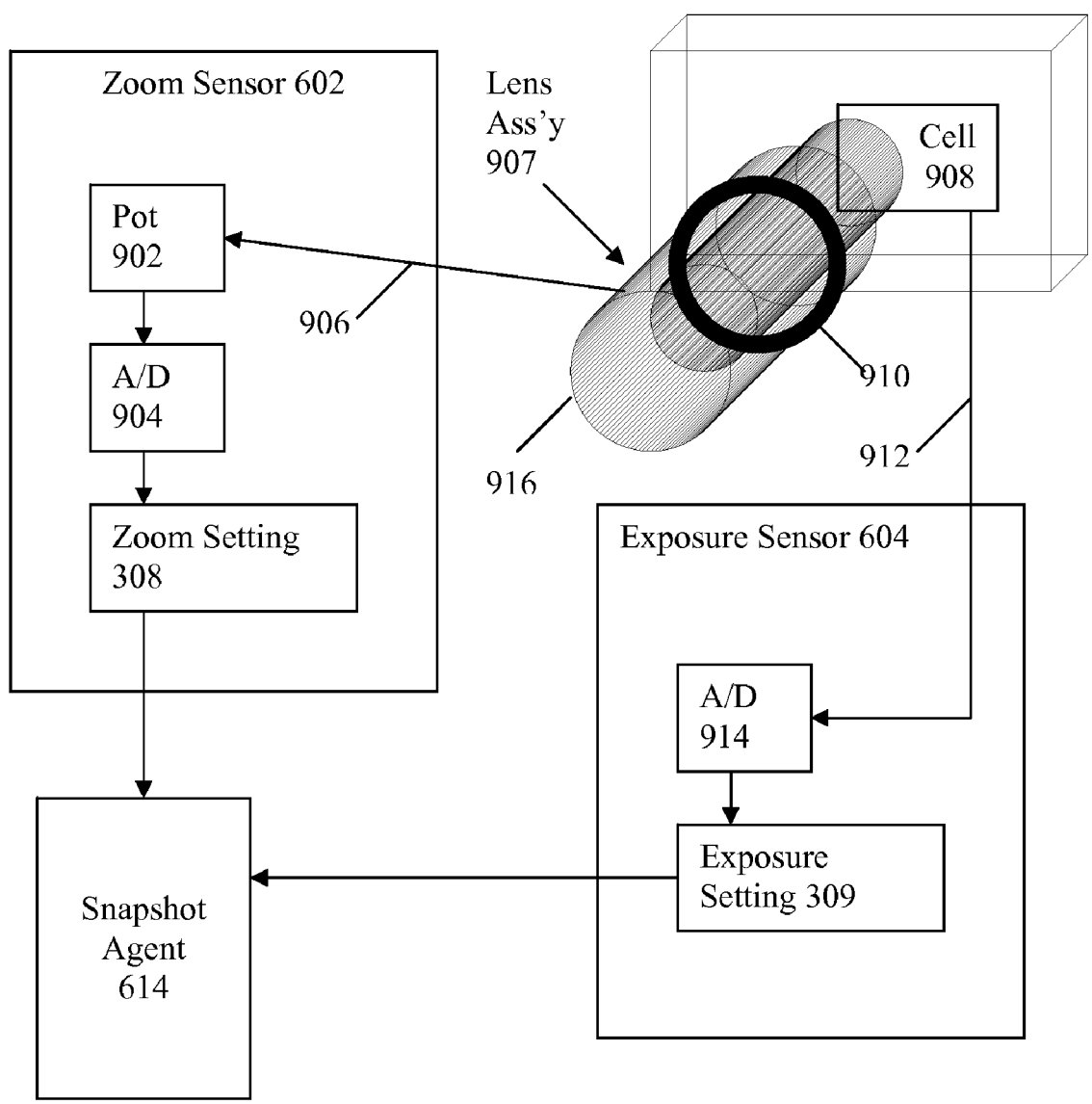
FIG. 9 is a block diagram of example embodiments of a zoom sensor and an exposure sensor.

In many embodiments of the kind illustrated in FIG. 9, the image request data elements include a data element for zoom and the virtual camera includes a lens assembly (907) having a first moveable element (916) and a zoom sensor (602). In such embodiments, the zoom sensor typically includes a potentiometer (902) having a wiper and a wiper contact (not shown), wherein the wiper is moveably coupled (906) to the first moveable element of the lens assembly (916). Such embodiments typically include an analog-to-digital converter (904) electrically coupled to the wiper contact of the potentiometer (902).

In many embodiments of the invention, as shown in FIG. 11, the image request data elements include a data element for zoom, and the virtual camera includes a zoom sensor (602). Such embodiments typically include reading (1110) a zoom value (1102) from the zoom sensor and storing (1112) the zoom value in the image request (302).

In many embodiments of the invention, as shown in FIG. 9, the image request data elements include a data element for exposure. In such embodiments, the virtual camera typically includes a lens assembly (907) having a second moveable element (910), and the second moveable element has the capability of adjusting the amount of light passing through a light path through the lens assembly. Such embodiments typically include an exposure sensor (604). In such embodiments, the exposure sensor typically includes a photocell (908) positioned in the light path through the lens assembly (907), and the photocell includes an electrical output contact (not shown). Such embodiments typically include an analog-to-digital converter (914) electrically coupled (912) to the electrical output contact of the photocell.

In many embodiments of the kind illustrated in FIG. 11, the image request data elements include a data element for exposure, and the virtual camera includes an exposure sensor (604). Such embodiments include reading (1110) an exposure value (1104) from the exposure sensor and storing (1112) the exposure value in the image request (302).

Editing Image Requests

Figure 12:
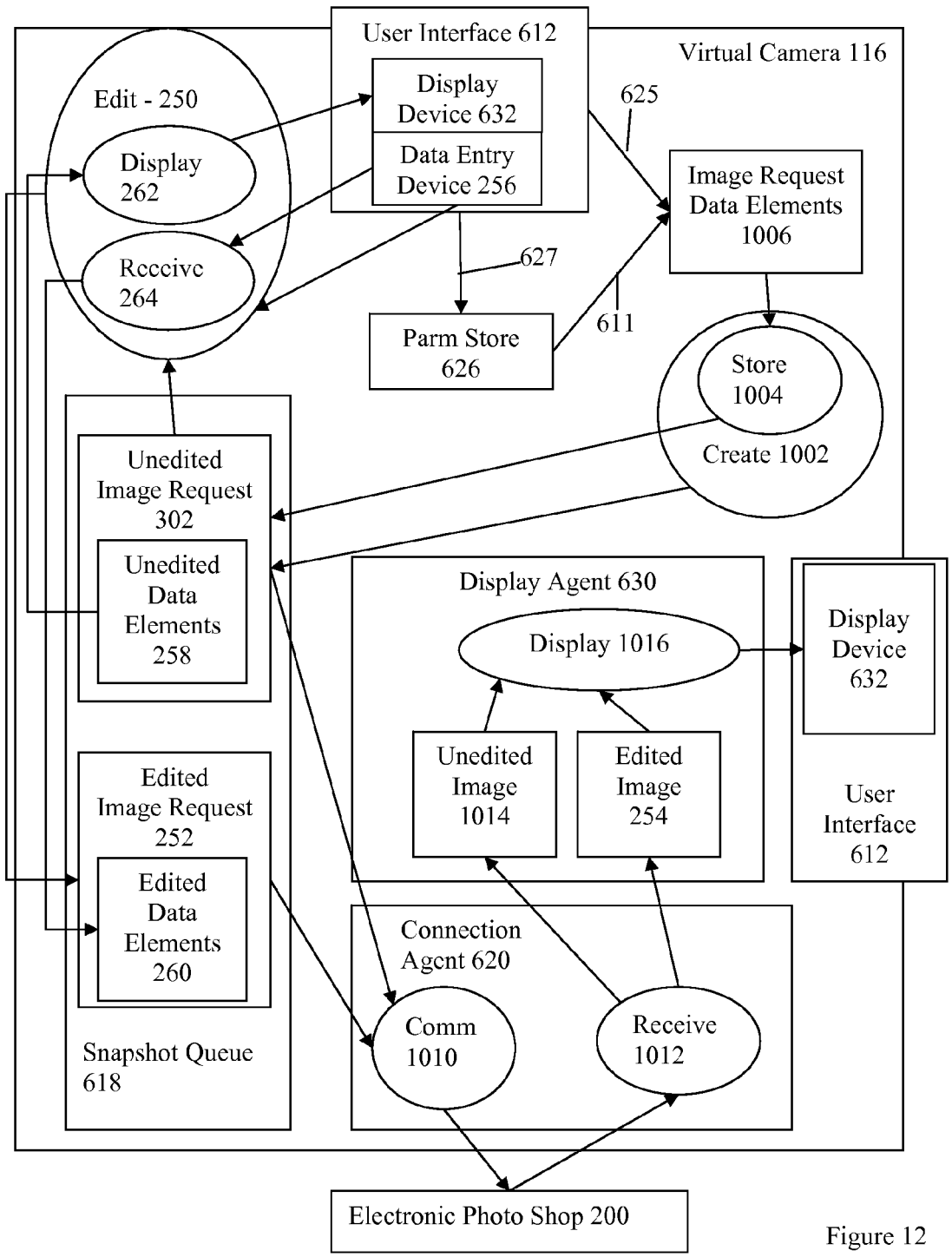
FIG. 12 sets forth a data flow diagram depicting a further exemplary method of digital imaging that includes editing image requests for digital images.

FIG. 12 sets forth a data flow diagram depicting a further exemplary method of digital imaging that includes editing image requests for digital images. The method of FIG. 12 includes creating (1002), in a virtual camera (116), an unedited image request (302) for an unedited digital image (1014). The method of FIG. 12 is implemented through use of a virtual camera, where, as described in more detail above in this disclosure, the virtual camera comprises automated computing machinery operating under software program control. The virtual camera includes a user interface (612) comprising at least one display device (632) and at least one data entry device (256). In some embodiments, a display device (632) and a data entry device (256) are the same physical device, as when they comprise, for example, a touch-sensitive screen.

The unedited image request (302) is an image request created as described above in detail in this disclosure. That is, created by storing image request data elements in an image request data structure. That is, an unedited image request according to the method of FIG. 12 comprises an image request data structure representing and describing a requested digital image. The image request data structure comprises image request data elements, and the image request data elements typically comprising at least data elements for location coordinates and a data element for view direction. In addition, image request data elements can include date, time, zoom or focal length, and exposure, F-stop setting, shutter speed, and so on, recalling only that all such attributes or data elements are 'virtual' in the sense that virtual cameras typically have no apertures measured by actual F-stops and no physical shutters to have an actual shutter speed. Rather such attributes in exemplary embodiments of the present invention are virtual analogues that approximate similar attributes of film cameras for use in digital imaging in electronic photo shops.

The method of FIG. 12 includes editing (250) the unedited image request (302), producing an edited image request (252) for an edited image (254). In the method of FIG. 12, the image requests, both the unedited and the edited image requests, are built upon an image request data structure such as the one illustrated at reference (302) in FIG. 4, and the images requests therefore include image request data elements such as location coordinates (such as latitude and longitude), view direction, date, time, zoom, and exposure. That is, there is no inherent difference in data structure among image requests, unedited image requests, and edited image requests. An unedited image request typically is 'edited,' according to embodiments of the present invention, in the sense that the values of its image request data elements are changed, not through any change of structure. This is an explanation, not a limitation. Editing can include changes in data structure, although typically it does not.

As shown also on FIG. 12, in the illustrated method, editing (250) an unedited image request (302) can be carried out, for example, by displaying (262) unedited image request data elements (258) on the display device (632) and receiving (264) edited image request data elements (260) from a data entry device (256) of the user interface (612). The user interface can be a GUI or a character-based interface.

The method of FIG. 12 includes communicating (1010) the edited image request (252) to a web site (200) for imaging for virtual cameras. In the terminology of this disclosure, the web site is an electronic photo shop, and, for an electronic photo shop that uses CGI scripts to retrieve and transcode digital images in response to image requests, an image request and more particularly its image request data elements can be communicated by use of a URI having a form, for example, like the following:

http://www.photoshop.com/cgi-bin/ImageRetrieve.cgi?latitude=39&longitude=77&direction=270

For an electronic photo shop that uses Microsoft Active Server Pages or 'ASPs' to retrieve and transcode digital images in response to image requests, an image request and more particularly its image request data elements can be communicated by use of a URI having a form, for example, like the following:

http://www.photoshop.com/cgi-bin/ImageRetrieve.asp?latitude=39&longitude=77&direction=270

For an electronic photo shop that uses Java Server Pages or 'JSPs' to retrieve and transcode digital images in response to image requests, an image request and more particularly its image request data elements can be communicated by use of a URI having a form, for example, like the following:

http://www.photoshop.com/cgi-bin/ImageRetrieve.jsp?
latitude=39&longitude=77&direction=270

The method of FIG. 12 includes receiving (1012), in the virtual camera, the edited digital image (254) from the web site (200). In embodiments in which the electronic photo shop (200) is implemented as a web site, receiving (1012) a digital image (1014) can be carried out by receiving an HTTP response message with the digital image appended in the form of a GIF file or a JPEG file, for example. The method of FIG. 12 also includes displaying (1016) the edited digital image (254) on a display device (632) of a user interface (612) of the virtual camera (116).

The method as illustrated in FIG. 12 also includes communicating (1010), from the virtual camera (116) to the web site (200) for imaging for virtual cameras, the unedited image request (302) for an unedited digital image (1014). The method of FIG. 12 also includes receiving (1012), in the virtual camera (116), the unedited digital image (1014) from the web site (200) and displaying (1016) the unedited digital image (1014) on the display device (632) of the virtual camera (116). This is a gloss on creating the unedited image request in the first place. That is, it is probably more usual to communicated an unedited image request, receive an unedited digital image, display it, and then edit it, so that the photographer can first see the subject matter before deciding what to change in the way of edits. Alternatively, a photographer can halt before communicating an unedited image request, perhaps because the photographer has an idea for a change that occurs before pushing the 'send' button, edit the unedited image request, and send for an edited image without first seeing the unedited image.

By now the reader has noticed some advantages of the illustrated method of digital imaging including editing image requests. The method illustrates a way of editing digital images by making changes in non-graphic data elements in a remote client device, a virtual camera, while the real work of manipulating graphic images, retrieving them from large image stores, transcoding them to fit a particular device type, screen size, and so on, occurs server-side in an electronic photo shop. There is no need for complex manipulations of graphic images in the virtual camera, which can be a simple, inexpensive, highly portable device. A virtual camera capable of supporting this kind of editing of graphic images can be made from any automated computing machinery capable of editing a few simple data elements for view direction, camera location, zoom, exposure, date, time, and so on.

Browsing Digital Images

Sharp eyed readers will have noticed that utilization of the method of FIG. 12 could include preparing several edited image requests in sequence and sending them all in sequence to an electronic photo shop so that receiving back and displaying the corresponding edited digital images would result in a changing display of graphic images in sequence. This disclosure now presents a way of automating such a process. Creating a multiplicity of image requests for digital images, communicating them, receiving and displaying the corresponding digital images in sequence is referred to as 'browsing,' distinguishing this 'browsing' from operation of a web browser as such.

Figure 13:
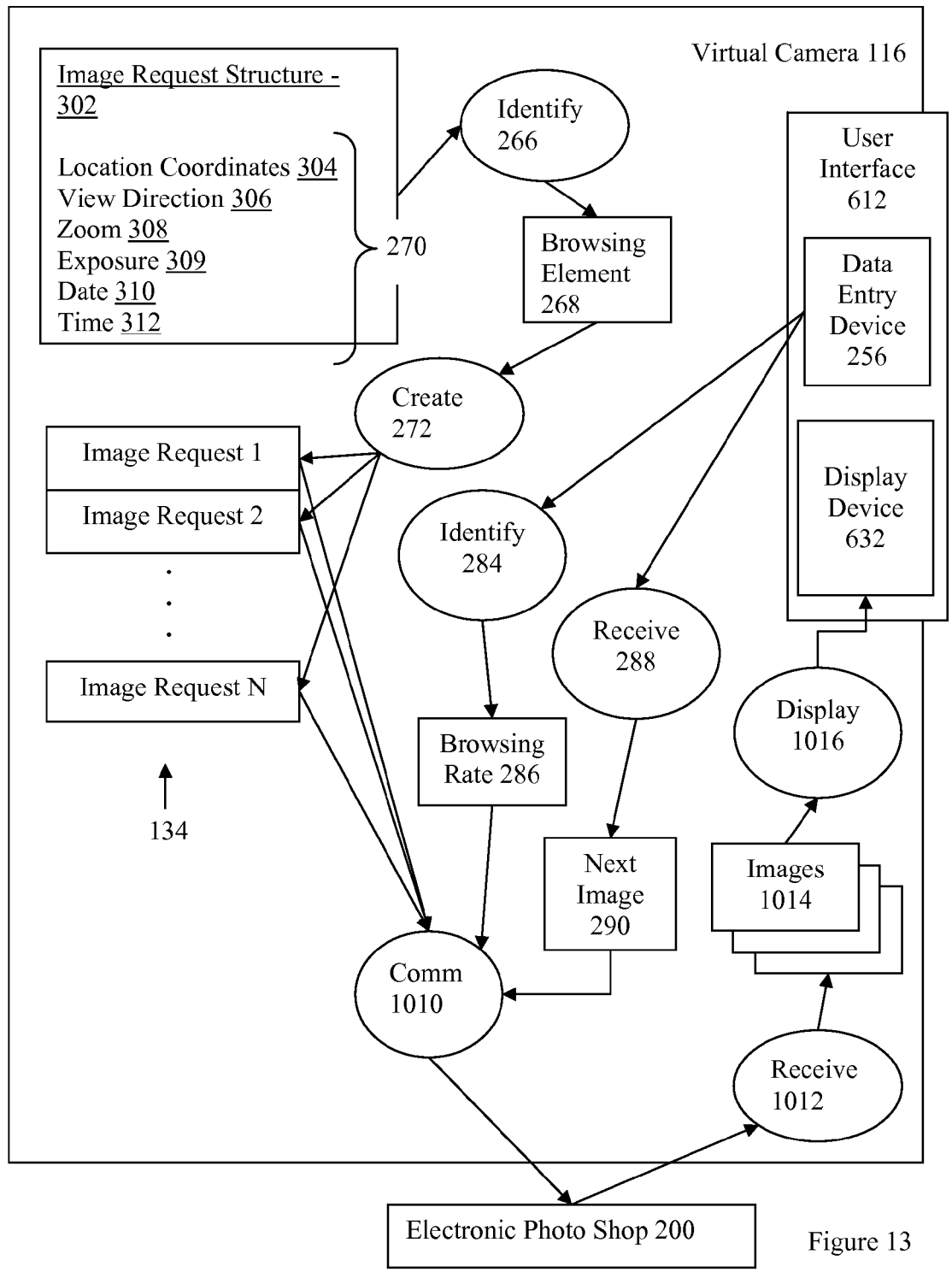
FIG. 13 sets forth a data flow diagram of an additional exemplary method of digital imaging that implements browsing digital images.

FIG. 13 sets forth a data flow diagram of an additional exemplary method of digital imaging that implements browsing digital images. The method of FIG. 13 includes identifying (266) a browsing image request data element (268) from among image request data elements (270) of an image request data structure (302). A browsing image request data element is an image request data element that is varied from image request to image request among a multiplicity of image requests, thereby changing the corresponding digital images as received back from an electronic photo shop.

The method of FIG. 13 also includes creating (272), in dependence upon the identified browsing image request data element (268), a multiplicity of image requests (134) for digital images (1014). In the method of FIG. 13, each image request comprises an instance of the image request data structure (302) having image request data elements (270) one of which is identified as the browsing image request data element (268). The method of FIG. 13 also includes communicating (1010) each image request (134) from a virtual camera (116) to a web site (200) for imaging for virtual cameras. The method of FIG. 13 also includes receiving (1012), in the virtual camera (116), each digital image (1014) from the web site (200) and displaying (1016) each digital image (1014) on a display device (632) of the virtual camera (116).

In image requests created according to the method of FIG. 13, values of the browsing image request data elements vary among the image requests. One example of varying browsing image request data elements across image requests is the following. Consider a multiplicity, a group or set of image requests, having the following image request data element values in common:

Location latitude=39 degrees north
Location longitude=77 degrees west, downtown Washington
View direction=270 degrees (due west)
Date=January 1
Time=0900
Zoom=45 millimeters In this example, the browsing image request data element is taken as view direction. Seven images are created, each incrementing view direction by 15 degrees, so that view direction in the first image request of the set is 270 degrees, 285 degrees in the second, 300 degrees in the third, 315 degrees in the fourth, 330 degrees in the fifth, 345 degrees in the sixth, and 360 degrees in the seventh. When these seven image requests are communicated to an electronic photo shop, received and displayed, they result in a sweeping change in view of downtown Washington, D.C., with the view directions rotating in six even steps from due west to due north.

The method of FIG. 13 also includes identifying (284) a browsing rate (286), wherein communicating (1010) each image request (134) from a virtual camera (116) to a web site (200) for imaging for virtual cameras is carried out in dependence upon the browsing rate (286). A browsing rate is a speed with which image requests are communicated to an electronic photo shop, one image request per second, or one image request every five seconds, and so on. Using a browsing rate means that a set of image requests according to the method of FIG. 13 can be communicated, received, and displayed one after another in sequence at regular intervals, so as to present to a user of a virtual camera on a display device of the virtual camera a continuous sequential display of digital images corresponding to the image requests.

The method of FIG. 13 also includes, as an alternative to use of a browsing rate, using 'next' or 'next-image' commands to step from one image to the next in a browse. More particularly, the method of FIG. 13 includes receiving (288) at least one 'next-image' command (290), each 'next-image' command representing an instruction to browse to a next digital image, wherein communicating (1010) each image request from a virtual camera to a web site for imaging for virtual cameras further comprises communicating each image request only after receiving (288) a 'next-image' command (290). A 'next-image' command can be implemented by any keystroke, button press, mouseclick, or switch operation in a user interface of a virtual camera. Using 'next-image' commands afford a user of a virtual camera the ability to step through a sequence of image requests one by one at intervals selected manually by the user, rather than viewing an automatic sequence as is provided by use of the browsing rate described above.

Figure 14:
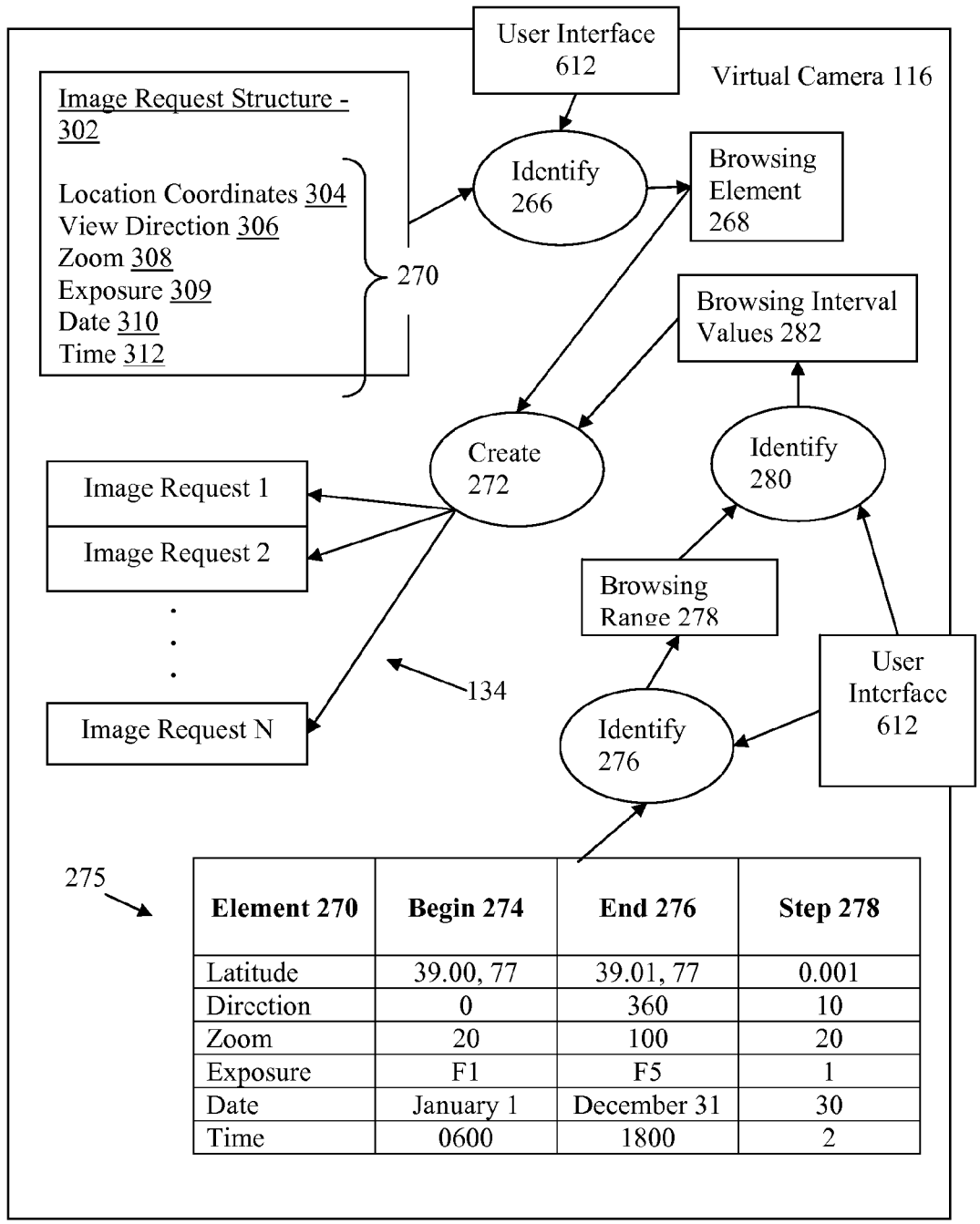
FIG. 14 sets forth a data flow diagram illustrating a further exemplary method of digital imaging that implements browsing digital images with a browsing range of values for a browsing image request data element.

FIG. 14 sets forth a data flow diagram illustrating a further exemplary method of digital imaging that implements browsing digital images with a browsing range of values for a browsing image request data element. More particularly, the method of claim 14 includes identifying (276) a browsing range (278) of values for a browsing image request data element (268). A browsing range of values is a range of values through which a browsing image request data elements is varied to effect browsing of digital images. A browsing range can be identified by a beginning range value and an ending range value. Identifying a browsing range of values can be implemented by, for example, reading them from a table such as the one illustrated at reference (275) in FIG. 4, where the table (275) includes range beginning values (274) and range ending values (276), which can be subtracted to identify a browsing range of values.

The method of FIG. 14 includes identifying (280) one or more browsing interval values (282) in a browsing range (278) for a browsing image request data element (268). Browsing interval values are cumulative sums of a beginning value for a browsing range plus a stepping interval. Browsing ranges and stepping values for image request data elements can be represented in computer data by use of a data structure such as that illustrated by the table at reference (275) in FIG. 14. The exemplary table (275) of FIG. 14 comprises a range beginning value (274), a range ending value (276), and a stepping value (278) for each of several image request data elements (270) including latitude, direction, zoom, exposure, date, and time. Each of the image request data elements (270) can be identified (266) or chosen as a browsing image request data element (268).

The method of claim 14 includes creating (272) a multiplicity of image requests (134). In the method of FIG. 14, creating (272) a multiplicity of image requests (134) includes creating, for each browsing interval value (282) in the browsing range (278), an image request (134), wherein each image request has a browsing image request data element (268) set to a browsing interval value.

For a further explanation of how browsing interval values are constructed as cumulative sums of a range beginning value and a stepping interval, consider an example where a browsing image request data element is taken as latitude, the beginning value of the range of latitudes is 39 degrees at 77 degrees longitude, the end value of the range is 39.01 degrees, and the stepping interval is 0.001 degrees, then the browsing interval values as cumulative sums of the beginning value plus the stepping interval are 39.001 degrees latitude, 39.002 degrees latitude, 39.003 degrees latitude, and so on, stopping after the tenth browsing interval value at the top of the browsing range, 39.01 degrees latitude, holding longitude constant in this example. If all other image request data element values are held constant, including particularly a constant view direction, then this example would provide a series of ten images of downtown Washington, D.C., each image would be similar in view direction, zoom, exposure, and so on, except that the image depict snapshots from viewpoints spaced several yards apart moving north along the $77^{th}$ parallel.

In methods according to FIG. 14, browsing image request data elements (268) can be identified (266) by prompting through a user interface (612) for a user to select one:

Please choose a browsing image request attribute:
   1 Location
   2. View Direction
   3. Zoom
   4. Exposure
   5. Date
   6. Time
Your selection (1-6): _

This exemplary menu is appropriate for a character-based interface, but a GUI can be used with pull-down menus, radio button, slider bars, and any other GUI element for user selections as will occur to anyone of skill in the art.

In embodiments of the kind illustrated by FIG. 14, browsing range values and stepping values can be taken from a table or record structure such as that illustrated at reference (275) in FIG. 14. Alternatively, identifying (276) a browsing range (278) of values for a browsing image request data element (268) can be implemented by prompting a user through a user interface (612) for a user to enter or select a browsing range, including specifying a beginning range value and an ending range value. Assume, for example, that a user in response to the menu prompt set forth above selected item number 2, View Direction, as a browsing image request data element. Then identifying (276) a browsing range (278) of values for a browsing image request data element (268) can be implemented, for example, by prompting a user through a user interface of a virtual camera as follows:

You selected View Direction as a browsing image request attribute. Please enter a beginning range value for browsing on View Direction. The default is 0 degrees, and leaving the beginning range entry blank takes the default.
   Your entry for beginning range value: _____
   Please enter an ending range value for browsing on View Direction. The default is 360 degrees, and leaving the ending range entry blank takes the default.
   Your entry for ending range value: _____
   Please enter a stepping value for browsing on View Direction. The default is 10 degrees, and leaving the stepping range entry blank takes the default.
   Your entry for stepping value: _____

Similarly, as shown in the prompts just above, identifying (280) one or more browsing interval values (282) in a browsing range (278) for a browsing image request data element (268) can include prompting for and receiving back as user input through a user interface (612) either browsing interval values as such or, as shown in the prompts just above, a stepping value from which browsing interval values are constructed as cumulative sums with a range beginning value.

In this example, values from the example table are used as defaults rather than actual processing values. More particularly, the virtual camera's (116) function for identifying (276) a browsing range (278) is programmed to take the beginning range value (274) from the table (275) as a default value for the beginning of the browsing range, which in this example is a beginning range value of 0 degrees for the browsing image request data element 'View Direction.' And the virtual camera's (116) function for identifying (276) a browsing range (278) is programmed to take the ending range value (276) from the example table (275) as a default value for the end of the browsing range, which in this example is an ending range value of 360 degrees for the browsing image request data element 'View Direction.' In this example, the virtual camera's (116) function for identifying (280) browsing interval values (282) is programmed to take the stepping value (276) from the table (275) as a default value for a stepping value from which to calculate browsing interval values (282). In this example, the default stepping value taken from table (275) is 10 degrees for the browsing image request data element 'View Direction.'

If a user took the defaults for all the browsing parameters in this example, beginning range value, ending range value, and stepping value, the software routine for identifying (280) browsing interval values (280) identifies thirty-seven browsing intervals for browsing on View Direction, beginning with a browsing interval value of 0 degrees (the beginning range value) and continuing at 10 degree steps with 10 degrees, 20 degrees, 30 degrees, and so on, and ending at the ending range value of 360. If a user took the defaults for all the browsing parameters in this example, then the create function (272) of the virtual camera (116), in creating an image request (134) for each browsing interval value (282) in the browsing range (278), creates thirty-seven image requests, each of which has the same values for image request data elements other than the browsing image request data element 'View Direction.' That is, if the set of thirty-seven image requests includes image request data elements for snapshot location (304), zoom (308), exposure (309), and so on, then the values of these data elements are the same across all the image requests in this example. The value of the browsing image request data element (268), however, varies across all the thirty-seven image requests, beginning with the first browsing interval value of 0 degrees for 'View Direction' and continuing at 10 degree intervals up to and including a View Direction of 360 degrees in the thirty-seventh image request in the set (134).

Communicating these thirty-seven exemplary image requests to an electronic photo shop, receiving back corresponding digital images, and displaying the images through a display device of a virtual camera results in a circular pan of thirty-seven sequential images beginning with a view direction of due north, 0 degrees, and rotating clockwise at 10 degree intervals through east, south, west, ending with the thirty-seventh image having again a view direction of due north, 360 degrees. If the images are displayed in dependence upon a browsing rate, displayed one after another in sequence at regular intervals, so as to present to a user of a virtual camera on a display device of the virtual camera a continuous sequential display of digital images corresponding to the image requests. If the images are displayed in dependence upon manually entered 'next' or 'next-image' commands, then the user of the virtual camera is afforded the ability to step through the sequence of images one by one at intervals selected manually by the user.

It will be understood from the foregoing description that various modifications and changes may be made in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method of digital imaging, the method comprising:
creating, in a virtual camera, an unedited image request for an unedited digital image;
editing the unedited image request, producing an edited image request for an edited image;
communicating the edited image request to a web site for imaging for virtual cameras;
receiving, in the virtual camera, the edited digital image from the web site; and
displaying the edited digital image on a display device of a user interface of the virtual camera.

2. The method of claim 1 further comprising:
communicating, from the virtual camera to the web site for imaging for virtual cameras, the unedited image request for an unedited digital image;
receiving, in the virtual camera, the unedited digital image from the web site; and
displaying the unedited digital image on the display device of the virtual camera.

3. The method of claim 1 wherein editing the unedited image request further comprises displaying unedited image request data elements on the display device and receiving edited image request data elements from a data entry device of the user interface.

4. The method of claim 1 wherein the image requests comprise image request data elements including location coordinates, view direction, date, time, zoom, and exposure.

5. A method of digital imaging, the method comprising:
identifying a browsing image request data element from among image request data elements of an image request data structure;
creating, in dependence upon the identified browsing image request data element, a multiplicity of image requests for digital images, wherein each image request comprises an instance of the image request data structure having image request data elements one of which is identified as the browsing image request data element and values of the browsing image request data elements vary among the image requests;
communicating each image request from a virtual camera to a web site for imaging for virtual camera;
receiving, in the virtual camera, each digital image from the web site; and
displaying each digital image on a display device of the virtual camera.

6. The method of claim 5 further comprising:
identifying a browsing range of values for the browsing image request data element;
identifying one or more browsing interval values in the browsing range for the browsing image request data element;
wherein creating a multiplicity of image requests further comprises creating, for each browsing interval value in the browsing range, an image request, wherein each image request has a browsing image request data element set to a browsing interval value.

7. The method of claim 5 further comprising identifying a browsing rate, wherein communicating each image request from a virtual camera to a web site for imaging for virtual cameras is carried out in dependence upon the browsing rate.

8. The method of claim 5 further comprising receiving at least one 'next-image' command, each 'next-image' command representing an instruction to browse to a next digital image, wherein communicating each image request from a virtual camera to a web site for imaging for virtual cameras further comprises communicating each image request only after receiving a 'next-image' command.

9. A virtual camera comprising:
means for creating, in the virtual camera, an unedited image request for an unedited digital image;
means for editing the unedited image request, producing an edited image request for an edited image;
means for communicating the edited image request to a web site for imaging for virtual cameras;

means for receiving, in the virtual camera, the edited digital image from the web site; and means for displaying the edited digital image on a display device of a user interface of the virtual camera.

10. The virtual camera of claim 9 further comprising:

means for communicating, from the virtual camera to the web site for imaging for virtual cameras, the unedited image request for an unedited digital image;

means for receiving, in the virtual camera, the unedited digital image from the web site; and means for displaying the unedited digital image on the display device of the virtual camera.

11. The virtual camera of claim 9 wherein means for editing the unedited image request further comprises means for displaying unedited image request data elements on the display device and means for receiving edited image request data elements from a data entry device of the user interface.

12. The virtual camera of claim 9 wherein the image requests comprise image request data elements including location coordinates, view direction, date, time, zoom, and exposure.

13. A virtual camera comprising:

means for identifying a browsing image request data element from among image request data elements of an image request data structure;

means for creating, in dependence upon the identified browsing image request data element, a multiplicity of image requests for digital images, wherein each image request comprises an instance of the image request data structure having image request data elements one of which is identified as the browsing image request data element and values of the browsing image request data elements vary among the image requests;

means for communicating each image request from a virtual camera to a web site for imaging for virtual cameras;

means for receiving, in the virtual camera, each digital image from the web site; and means for displaying each digital image on a display device of the virtual camera.

14. The virtual camera of claim 13 further comprising:

means for identifying a browsing range of values for the browsing image request data element;

means for identifying one or more browsing interval values in the browsing range for the browsing image request data element;

wherein means for creating a multiplicity of image requests further comprises means for creating, for each browsing interval value in the browsing range, an image request, wherein each image request has a browsing image request data element set to a browsing interval value.

15. The virtual camera of claim 13 further comprising means for identifying a browsing rate, wherein means for communicating each image request from a virtual camera to a web site for imaging for virtual cameras functions in dependence upon the browsing rate.

16. The virtual camera of claim 13 further comprising means for receiving at least one 'next-image' command, each 'next-image' command representing an instruction to browse to a next digital image, wherein means for communicating each image request from a virtual camera to a web site for imaging for virtual cameras further comprises means for communicating each image request only after receiving a 'next-image' command.

17. A computer program product for digital imaging, the computer program product comprising a computer readable recording medium, the recording medium comprising computer program instructions that when executed by a computer processor cause the processor to carry out the steps of:

creating, in the virtual camera, an unedited image request for an unedited digital image;

editing the unedited image request, producing an edited image request for an edited image;

communicating the edited image request to a web site for imaging for virtual cameras;

receiving, in the virtual camera, the edited digital image from the web site; and displaying the edited digital image on a display device of a user interface of the virtual camera.

18. The computer program product of claim 17 further comprising:

communicating, from the virtual camera to the web site for imaging for virtual cameras, the unedited image request for an unedited digital image;

receiving, in the virtual camera, the unedited digital image from the web site; and displaying the unedited digital image on the display device of the virtual camera.

19. The computer program product of claim 17 wherein editing the unedited image request further comprises displaying unedited image request data elements on the display device and receiving edited image request data elements from a data entry device of the user interface.

20. The computer program product of claim 17 wherein the image requests comprise image request data elements including location coordinates, view direction, date, time, zoom, and exposure.

21. A computer program product for digital imaging, the computer program product comprising a computer readable recording medium, the recording medium comprising computer program instructions that when executed by a computer processor cause the processor to carry out the steps of:

identifying a browsing image request data element from among image request data elements of an image request data structure;

creating, in dependence upon the identified browsing image request data element, a multiplicity of image requests for digital images, wherein each image request comprises an instance of the image request data structure having image request data elements one of which is identified as the browsing image request data element and values of the browsing image request data elements vary among the image requests;

communicating each image request from a virtual camera to a web site for imaging for virtual cameras;

receiving, in the virtual camera, each digital image from the web site; and displaying each digital image on a display device of the virtual camera.

22. The computer program product of claim 21 further comprising:

identifying a browsing range of values for the browsing image request data element;

identifying one or more browsing interval values in the browsing range for he browsing image request data element;

wherein creating a multiplicity of image requests further comprises creating, for each browsing interval value in the browsing range, an image request, wherein each image request has a browsing image request data element set to a browsing interval value.

23. The computer program product of claim 21 further comprising identifying a browsing rate, wherein communicating each image request from a virtual camera to a web site for imaging for virtual cameras functions in dependence upon the browsing rate.

24. The computer program product of claim 21 further comprising receiving at least one 'next-image' command, each 'next-image' command representing an instruction to browse to a next digital image, wherein communicating each image request from a virtual camera to a web site for imaging for virtual cameras further comprises communicating each image request only after receiving a 'next-image' command.

* * * * *